United States Patent
Morita et al.

(10) Patent No.: US 9,014,862 B2
(45) Date of Patent: Apr. 21, 2015

(54) HYDRAULIC PRESSURE CONTROL APPARATUS

(75) Inventors: Yoshio Morita, Fuji (JP); Takayuki Nagase, Fuji (JP); Takaaki Matsui, Fuji (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 445 days.

(21) Appl. No.: 13/280,893

(22) Filed: Oct. 25, 2011

(65) Prior Publication Data

US 2012/0109385 A1    May 3, 2012

(30) Foreign Application Priority Data

Oct. 28, 2010  (JP) ................................. 2010-242142

(51) Int. Cl.
| | |
|---|---|
| *G05D 9/00* | (2006.01) |
| *F15B 21/08* | (2006.01) |
| *F15B 19/00* | (2006.01) |
| *F16D 48/06* | (2006.01) |
| *F16H 61/02* | (2006.01) |
| *F16D 48/02* | (2006.01) |

(52) U.S. Cl.
CPC ............. *F15B 21/087* (2013.01); *F15B 19/002* (2013.01); *F16D 48/066* (2013.01); *F16H 61/0251* (2013.01); *F16D 2500/30803* (2013.01); *F16D 2500/70217* (2013.01); *F16D 2500/70223* (2013.01); *F16D 2500/70406* (2013.01); *F16D 2500/70605* (2013.01); *F16D 2048/0269* (2013.01)

(58) Field of Classification Search
USPC ............... 700/281; 192/3.29, 3.57; 123/90.12
See application file for complete search history.

(56) References Cited

U.S. PATENT DOCUMENTS

| | | | |
|---|---|---|---|
| 4,577,143 A | | 3/1986 | Eschrich et al. |
| 5,780,777 A | * | 7/1998 | Selig ........................... 177/25.11 |
| 6,056,008 A | * | 5/2000 | Adams et al. ............... 137/487.5 |
| 6,751,542 B2 | | 6/2004 | Ishii et al. |
| 8,480,540 B2 | * | 7/2013 | Reibold ......................... 477/180 |
| 2003/0183280 A1 | * | 10/2003 | Ishii et al. ................... 137/487.5 |
| 2003/0187562 A1 | | 10/2003 | Ishii et al. |
| 2006/0011878 A1 | * | 1/2006 | Denyer et al. ............. 251/129.08 |
| 2007/0118318 A1 | * | 5/2007 | Cripe ............................ 702/104 |
| 2008/0042087 A1 | * | 2/2008 | Pfaff ......................... 251/129.04 |
| 2010/0211229 A1 | * | 8/2010 | Hinami et al. ................ 700/282 |

FOREIGN PATENT DOCUMENTS

| | | |
|---|---|---|
| DE | 34 07 952 A1 | 4/1985 |
| DE | 198 13 913 A1 | 9/1999 |

(Continued)

*Primary Examiner* — Kenneth Lo
*Assistant Examiner* — Md N Mia
(74) *Attorney, Agent, or Firm* — Foley & Lardner LLP

(57) ABSTRACT

A hydraulic pressure control apparatus includes a solenoid valve; a hysteresis hydraulic pressure correction amount calculation section calculating a hysteresis hydraulic pressure correction amount and a command current control section controlling the command current in accordance with the hysteresis hydraulic pressure correction amount. The hysteresis hydraulic pressure correction amount calculation section has, as a reference map, a full hysteresis characteristic, and is configured to make a plurality of reduction maps obtained by reducing the reference map in accordance with a turn-round position at one of minor loops from a past to a present time when the minor loop continues, and to calculate the hysteresis hydraulic pressure correction amount by summation of hysteresis hydraulic pressure correction amounts obtained by the reduction maps in the same command current position.

7 Claims, 13 Drawing Sheets

(56) References Cited

FOREIGN PATENT DOCUMENTS

| DE | 102006011350 | * | 9/2007 |
| DE | 102006011350 A1 | * | 9/2007 |
| EP | 2 221 511 A1 | | 8/2010 |
| JP | 2003-294126 A | | 10/2003 |

* cited by examiner

FIG.1
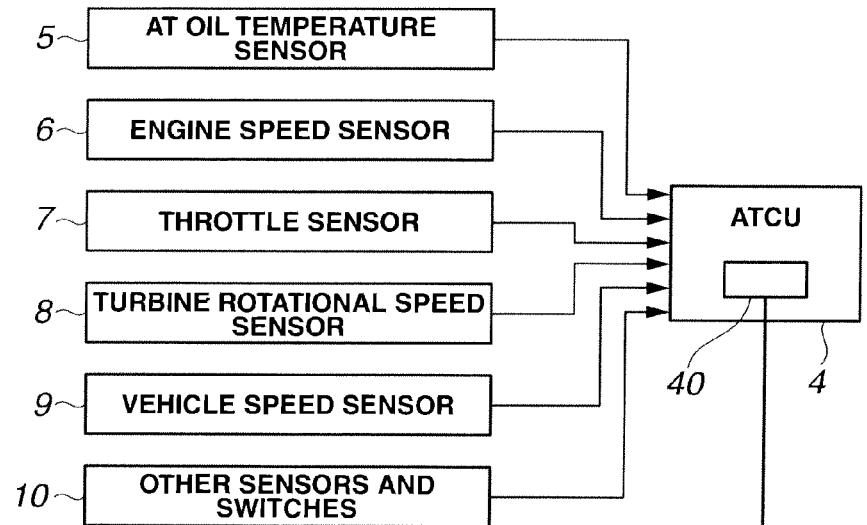
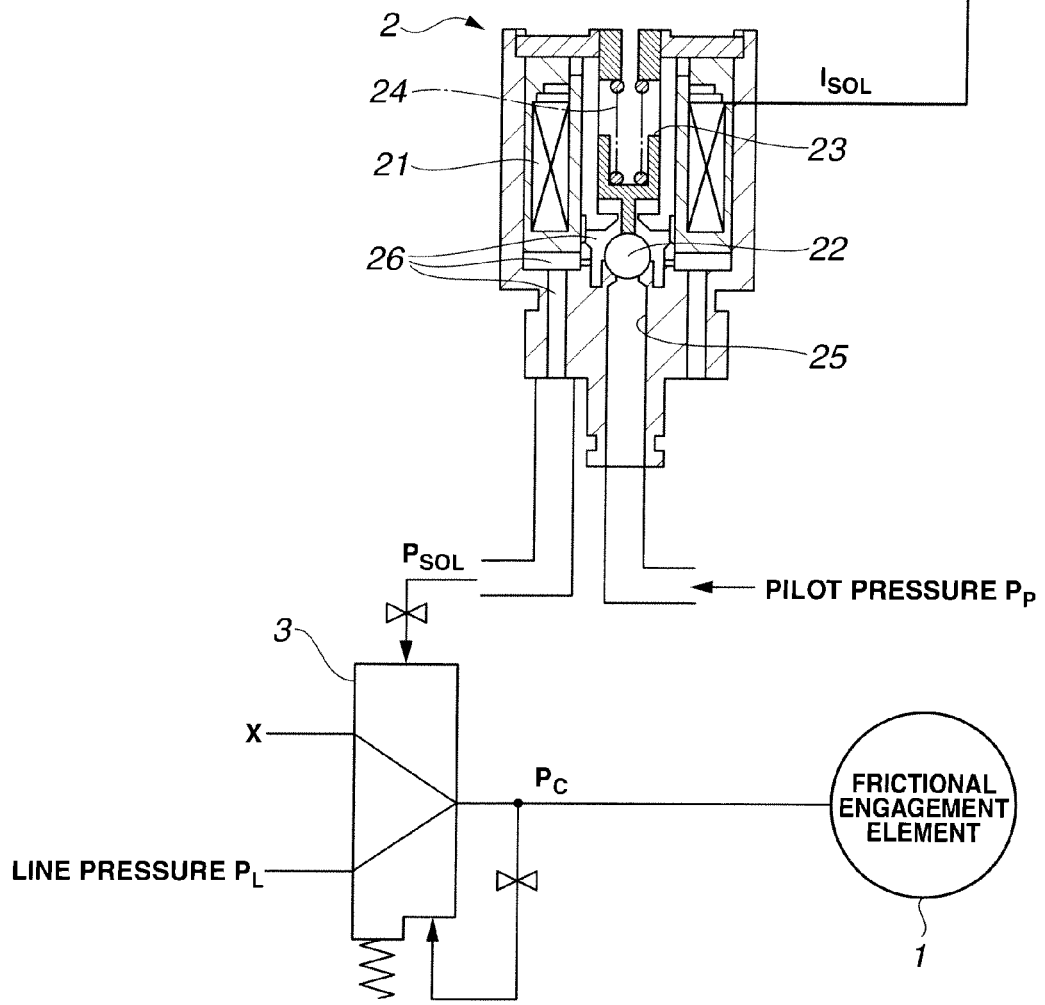

RELATIVE TO PRESSURE
INCREASING CHARACTERISTIC

RELATIVE TO CENTRAL
CHARACTERISTIC

HYDRAULIC PRESSURE CONTROL APPARATUS

BACKGROUND OF THE INVENTION

This invention relates to a hydraulic pressure control apparatus including a solenoid valve arranged to adjust an opening degree in accordance with a command current, and to control to increase or decrease a hydraulic pressure.

Conventionally, in case of a solenoid valve to control a hydraulic pressure, a hysteresis is generated in a driving current of a solenoid and an output pressure on an increasing side and a decreasing side of the current. As a countermeasure against this, an actual measurement map is formed from an actual measured value of the output pressure at each current value when the current value increases to maximize the output pressure and then the current value decreases to zero. A current average value between the increasing side current value and the decreasing side current value which correspond to the same output pressure measured value on the measurement map is calculated. A map representing a relationship between the calculated current average value and the output pressure measured value is formed. The driving current of the solenoid is controlled by using this map (cf. for example, U.S. Pat. No. 6,751,542 (corresponding to Japanese Patent Application Publication No. 2003-294126)).

SUMMARY OF THE INVENTION

However, in the above-described conventional hydraulic pressure control apparatus using the solenoid valve, the driving current is corrected by using the current average value calculated based on the actual measurement map obtained from the actual measured value of the output pressure at each current value when the current value is increased to maximize the output pressure and then the current value is decreased. Accordingly, a hysteresis hydraulic pressure correction amount has a deviation amount when the command current is turned back in midstream (on the way) before the hydraulic pressure becomes the maximum pressure. Consequently, it is not possible to obtain the relationship between the driving current and the output pressure at high accuracy, and to deteriorate the accuracy of the hydraulic pressure control.

That is, the hysteresis amount of the solenoid valve is varied in accordance with a position in which the driving current is switched from the increasing direction to the decreasing direction (or, from the decreasing direction to the increasing direction), and a used hydraulic pressure region. Accordingly, when the correction is performed based on the actual measurement map representing the full hysteresis amount in a case in which the command current is turned back in the midstream position before the hydraulic pressure becomes the maximum pressure, the hysteresis hydraulic pressure correction amount includes the deviation amount. Moreover, when the hydraulic pressure control is performed to continue many times of the turn-round of the command current, the deviation amounts of the hysteresis hydraulic pressure correction amount are accumulated in accordance with the turn-round frequency. Accordingly, the hysteresis hydraulic pressure correction amount is gradually deviated from a correct hysteresis hydraulic pressure correction amount to deteriorate the accuracy of the hysteresis hydraulic pressure correction amount.

It is, therefore, an object of the present invention to provide a hydraulic control apparatus devised to solve the above-mentioned problems, and to improve the hydraulic pressure control accuracy by performing a hysteresis error correction corresponding to a turn-round position and a turn-round frequency of a command current to a solenoid valve.

According to one aspect of the present invention, a hydraulic pressure control apparatus comprises: a solenoid valve configured to regulate an opening degree in accordance with a command current, and to control to increase or decrease a hydraulic pressure; a hysteresis hydraulic pressure correction amount calculation section configured to calculate a hysteresis hydraulic pressure correction amount which is determined by a hysteresis characteristic of an output hydraulic pressure with respect to the command current in an increasing direction and in a decreasing direction of the command current; and a command current control section configured to control the command current in accordance with the hysteresis hydraulic pressure correction amount so that the output hydraulic pressure becomes a target output hydraulic pressure, the hysteresis hydraulic pressure correction amount calculation section having, as a reference map, a full hysteresis characteristic representing a hysteresis with respect to a hydraulic pressure variation characteristic having a pressure increasing characteristic when the command current is varied from a minimum value to a maximum value, and a pressure decreasing characteristic when the command current is varied from the maximum value to the minimum value, the hysteresis hydraulic pressure correction amount calculation section being configured to make a plurality of reduction maps each of which is obtained by reducing the reference map in accordance with a turn-round position at one of minor loops from a past to a present time when the minor loop in which the command current is turned back in a middle within the hydraulic pressure variation characteristic region continues, and to calculate the hysteresis hydraulic pressure correction amount by summation of the hysteresis hydraulic pressure correction amounts obtained by the plurality of the reduction maps in the same command current position.

BRIEF DESCRIPTION OF THE DRAWINGS

FIG. 1 is a control system diagram showing a frictional engagement element pressure control system for an automatic transmission of a vehicle, to which a hydraulic pressure control apparatus according to one embodiment of the present invention is applied.

DETAILED DESCRIPTION OF THE INVENTION

Figure 2:
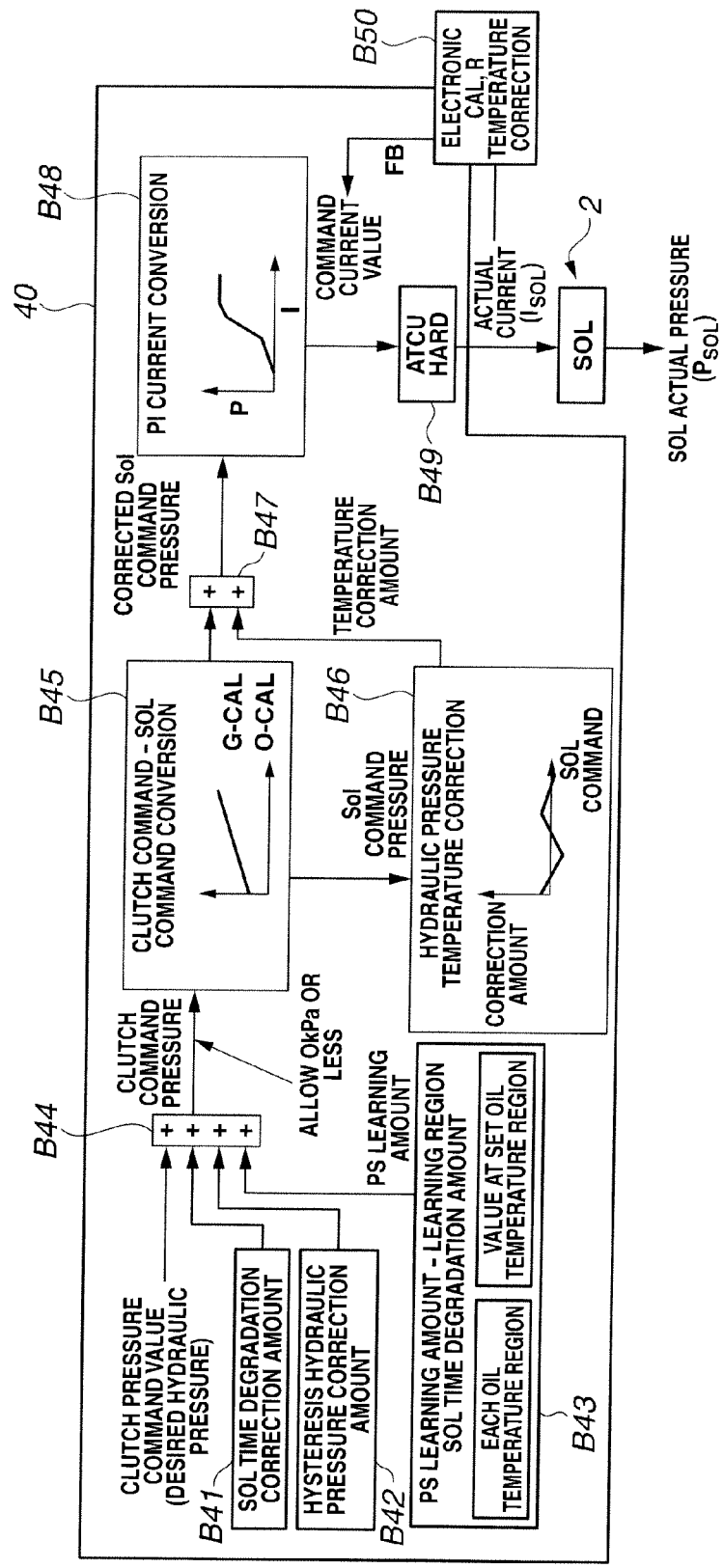
FIG. 2 is a control block diagram showing a configuration and a flow of a clutch pressure correction control operation in a clutch pressure correction control section 40 in an automatic transmission control unit 4 of FIG. 1.

Hereinafter, a hydraulic pressure control apparatus according to one embodiment of the present invention is illustrated with reference to drawings.

First Embodiment

FIG. 1 is a control system diagram showing a frictional engagement element pressure control system for an automatic transmission of a vehicle, to which the hydraulic pressure control apparatus according to the first embodiment is applied. Hereinafter, an entire configuration is illustrated with reference to FIG. 1. As shown in FIG. 1, the frictional engagement element pressure control system includes a frictional engagement element 1, a linear solenoid valve 2 (electromagnetic valve), a control valve 3, and an automatic transmission control unit 4.

Frictional engagement element 1 is provided within the automatic transmission for the vehicle. Frictional engagement element 1 is a hydraulic multiple plate clutch, a hydraulic multiple plate brake or so on which is controlled to a full engagement, a slip engagement, and a disengagement by an engagement element pressure Pc from control valve 3.

Linear solenoid valve 2 is arranged to receive, as a source pressure, a pilot pressure $P_p$ (constant pressure) generated by a pilot valve (not shown), and to generate a solenoid pressure $P_{SOL}$ to control valve 3 by being applied with a solenoid current $I_{SOL}$ (for example, duty driving current of 800 Hz) from automatic transmission control unit 4. As shown in FIG. 1, this linear solenoid valve 2 includes a solenoid coil 21, a ball 22, a plunger 23, a spring 24, a pilot pressure flow passage 25, and a solenoid pressure flow passage 26. In a valve operation, when solenoid current $I_{SOL}$ is zero, ball 22 is pressed to close by an urging force of spring 24, so that solenoid pressure $P_{SOL}$ becomes zero. When solenoid current $I_{SOL}$ which is a command current with respect to solenoid coil 21 is increased, ball 22 is moved in an open direction against the urging force, so that solenoid pressure $P_{SOL}$ which is the output pressure is increased.

Control valve 3 is a pressure regulating valve arranged to receive, as an operation signal pressure, solenoid pressure $P_{SOL}$ from linear solenoid valve 2 and feedbacked engagement element pressure Pc, to receive, as a source pressure, a line pressure $P_L$ from a line pressure control valve (not shown), and to control (regulate) engagement element pressure Pc to frictional engagement element 1. This control valve 3 is arranged to perform a hydraulic control operation to increase engagement element pressure Pc to frictional engagement element 1 as solenoid pressure $P_{SOL}$ becomes higher.

As shown in FIG. 1, automatic transmission control unit 4 is arranged to receive sensor signals and switch signals from an AT oil temperature sensor 5, an engine speed sensor 6, a throttle sensor 7, a turbine rotational speed sensor 8, a vehicle speed sensor 9, and other sensors and switches 10. This automatic transmission control unit 4 is arranged to perform a shift control operation to output a shift start command when an operating point based on the throttle opening and the vehicle speed moves across an upshift line and a downshift line in a predetermined shift schedule (for example, a shift schedule of 7th forward speed). Moreover, automatic transmission control unit 4 is arranged to perform a calculation of a clutch pressure command value in a shift transition and a calculation of the clutch pressure command value at a slip engagement control, in accordance with a shift start command, and a variation of a gear ratio Gr determined by the turbine rotational speed (AT input rotational speed) and the vehicle speed (AT output rotational speed). Moreover, automatic transmission control unit 4 includes a clutch pressure correction control section 40 configured to calculate a correction amount (SOL time (-dependent) degradation correction amount, a hysteresis hydraulic pressure correction amount, and a PS learning amount) with respect to the clutch pressure command value (desired hydraulic pressure), to obtain a clutch command pressure (clutch instruction pressure) which is obtained by amending the clutch pressure command value, and to generate a solenoid current $I_{SOL}$ which is an actual current by performing the temperature correction and the current conversion with respect to the clutch command pressure.

FIG. 2 is a control block diagram showing a configuration and a flow of a clutch pressure correction control operation in a clutch pressure correction control section 40 of automatic transmission control unit 4 in the hydraulic pressure control apparatus according to this embodiment. Hereinafter, each block in FIG. 2 is illustrated.

A block B41 is an SOL time degradation correction amount calculation block which is for dissolving an influence of an ex-post time (posterior) degradation generated in the control mechanism, and which is configured to calculate an SOL time degradation correction amount. The learning correction amount is divided into an initial learning amount due to individual variation, and a time degradation amount due to the ex-post time degradation in the control mechanism system. The SOL time degradation correction amount is determined based on the command current value and a time degradation progression degree which is indicated by a difference between a PS learning region correction amount and a PS initial learning amount.

A block B42 is a hysteresis hydraulic pressure correction amount calculation block which is for performing a hysteresis correction to dissolve a hysteresis error in accordance with a turn-round position and a turn-round frequency of solenoid current $I_{SOL}$ (command current) to linear solenoid valve 2, and which is configured to calculate a hysteresis hydraulic pressure correction amount. This hysteresis hydraulic pressure correction amount has, as a reference map, a full hysteresis characteristic drawing a full loop. When a minor loop in which the command current is turned back in the midstream of a region of the full loop continues, a plurality of reduction maps which are obtained by reducing the reference map in accordance with turn-round positions are formed, respectively, in the minor loops from the past to the present time. A final hysteresis hydraulic pressure correction amount is calculated by a summation of the hysteresis hydraulic pressure correction amounts obtained by the plurality of the reduction maps in the same command current position. This is illustrated in detail with reference to FIGS. 3-7.

A block B43 is a PS learning amount calculation block which is configured to correct to dissolve a deviation caused by a variation of AT oil temperature (variation of the viscosity of the hydraulic fluid), and which is configured to calculate the PS learning amount corresponding to the AT oil temperature. The PS learning amount are separately stored in each of the sensed AT oil temperature regions. A learning region SOL time degradation amount is calculated in a set oil temperature region on which the sensed AT oil temperature is reflected. This PS learning amount is determined by a difference between the PS learning amount and the learning region SOL time degradation amount.

A block B44 is a clutch command pressure calculation block which is configured to add, to the clutch pressure command value (the desired hydraulic pressure), the SOL time degradation correction amount in block B41, the hysteresis hydraulic pressure correction amount in block B42, and the PS learning amount in block B43, and thereby to calculate the clutch command pressure obtained by amending the clutch pressure command value.

A block B45 is a command pressure conversion block which receives the clutch command pressure from block B44, and which is configured to convert the clutch command pressure to an SOL command pressure by using a command pressure conversion map and so on.

A block 46 is a hydraulic pressure temperature correction block which receives the SOL command pressure from block B45, which performs a hydraulic pressure temperature correction, and which outputs a temperature correction amount.

A block B47 is a corrected SOL command pressure calculation block which is configured to add the SOL command pressure from block B45, and the temperature correction amount from block B46, and thereby to calculate the corrected SOL command pressure.

A block B48 is a PI current conversion block configured to receive the corrected SOL command pressure from block B48, and to correct the corrected SOL command to the command current value by using a PI current conversion map and so on.

A block B49 is an actual current conversion block configured to covert the command current value from block B48, to an actual current (solenoid current $I_{SOL}$), by a solenoid driving circuit. This actual current (solenoid current $I_{SOL}$) is applied to solenoid coil 21 of linear solenoid valve 2.

A block B50 is an actual current feedback block configured to monitor the actual current from block B49, and to add a necessary feedback correction to the command current value from block B48. The correction input in block B42 configured to calculate the hysteresis hydraulic pressure correction amount is not a monitor current that the feedback correction is added, and is the command current value from block B48. This is because the monitor current has a delay due to the feedback correction, and thereby presumption of the hysteresis is delayed.

Figure 3:
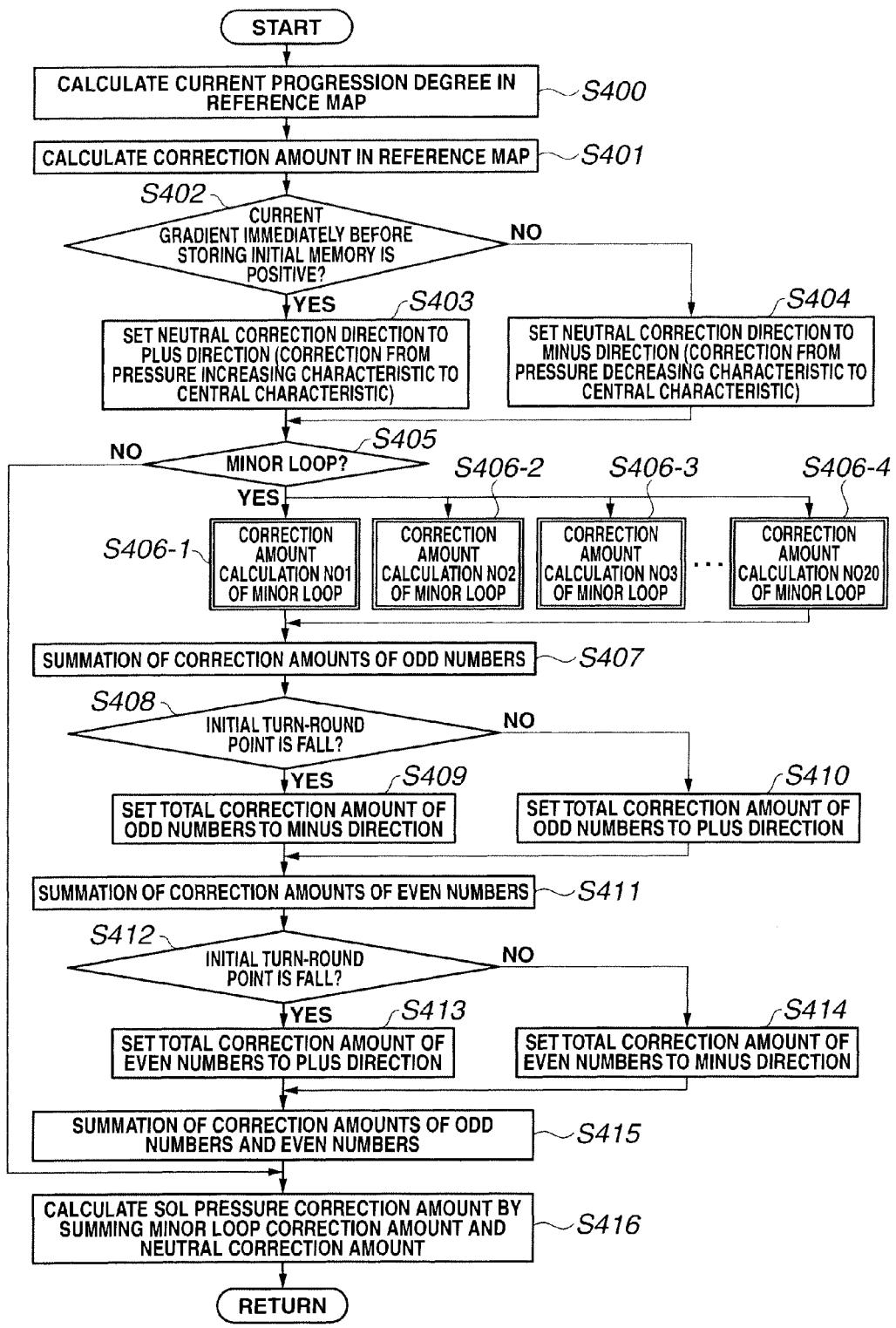
FIG. 3 is a flowchart showing a configuration and a flow of a hysteresis hydraulic pressure correction amount calculation in clutch pressure correction control section 40 in automatic transmission control unit 4 of FIG. 1.

FIG. 3 is a flowchart showing a configuration and a flow of a hysteresis hydraulic pressure correction amount calculation in clutch pressure correction control section 40 in automatic transmission control unit 4 in this embodiment (hysteresis hydraulic pressure correction amount calculation section). Hereinafter, steps of FIG. 3 are illustrated. "Fall" in the flowchart means a turn-round from the pressure increasing characteristic to the pressure decreasing characteristic. "Rise" means a turn-round from the pressure decreasing characteristic to the pressure increasing characteristic.

Figure 5:
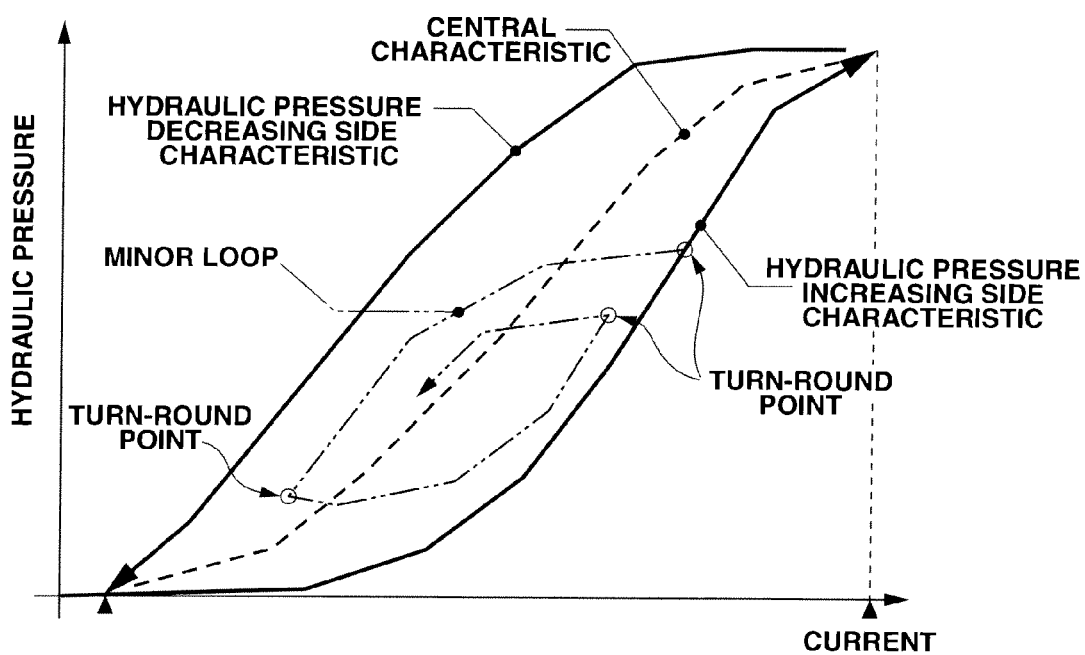
FIG. 5 is an illustrative view showing a reference map (a full loop, a central characteristic, and a minor loop) used in the hysteresis hydraulic pressure correction amount calculation.

At step S400, clutch pressure correction control section 40 calculates a current progression degree which is used for presumption of the hysteresis hydraulic pressure correction amount from a reference map (FIG. 5), and the process proceeds to step S401. "The reference map" is a map representing a hysteresis characteristic with respect to a central characteristic of a full loop. "The full loop" means a characteristic of the hydraulic pressure variation with respect to the current when the current increases from 0 mA (a minimum value of the command current) to 800 mA (a maximum value of the command current), and then the current decreases to 0 mA. "The minor loop" means a characteristic of the hydraulic pressure variation with respect to the current when the current is turned back in the midstream of (on the way of, in the middle of) the full loop. The reference map of FIG. 5 is set as a map having a hysteresis characteristic drawing the full loop based on many experimental values previously performed. The current progression degree is calculated by the following equation:

The current progression degree(%)={the command current value−max(hysteresis correction current region lower limit value, the current value of the turn-round to the increase)}/the turn-round correction region current width*100

Subsequently to the calculation of the current progression degree at step S400, at step S401, clutch pressure correction control section 40 calculates the hysteresis hydraulic pressure correction amount in the reference map based on the current progression degree, and the process proceeds to step S402.

Subsequently to the calculation of the hysteresis hydraulic pressure correction amount in the reference map at step S401, at step S402, clutch pressure correction control section 40 judges whether the current gradient immediately before storing an initial memory is a positive value or a negative value. When the answer of step S402 is affirmative (YES) (the current gradient is positive), the process proceeds to step S403. When the answer of step S402 is negative (NO) (the current gradient is negative), the process proceeds to step S404. The current gradient is obtained by the derivation of the command current value.

Subsequently to the judgment that the current gradient is the positive value at step S402, at step S403, clutch pressure correction control section 40 sets the neutral correction direction to a plus direction. Clutch pressure correction control section 40 calculates a neutral hysteresis correction amount to correct from the pressure increasing characteristic to the central characteristic, and the process proceeds to step S405.

Subsequently to the judgment that the current gradient is the negative value at step S402, at step S404, clutch pressure correction control section 40 sets the neutral correction direction to a minus direction. Clutch pressure correction control section 40 calculates the neutral hysteresis correction amount to correct from the pressure decreasing characteristic to the central characteristic, and the process proceeds to step S405. That is, at steps S403 and S404, clutch pressure correction control section 40 sets, as a target characteristic, the central characteristic between the hydraulic pressure increasing side characteristic (the pressure increasing characteristic) and the hydraulic pressure decreasing side characteristic (the pressure decreasing characteristic). Clutch pressure correction control section 40 calculates the hysteresis hydraulic pressure correction amount with respect to this target characteristic.

Subsequently to the calculation of the neutral hysteresis correction amount at step S403 or S404, at step S405, clutch pressure correction control section 40 judges whether or not it is the minor loop that the command current is turned back in the midstream of the full loop. When the answer of step S405 is affirmative (YES) (the minor loop), the process proceeds to step S406. When the answer of step S405 is negative (NO) (the full loop), the process proceeds to step S416.

Subsequently to the judgment of the minor loop at step S405, at step S406, clutch pressure correction control section 40 calculates the hysteresis hydraulic pressure correction amount of the minor loop in accordance with the flowchart shown in FIG. 4, and the process proceeds to step S407. In this calculation of the hysteresis hydraulic pressure correction amount of the minor loop, a number (No. 1-No. 20) is provided at each turn-round point after entering the minor loop. This calculation of the hysteresis hydraulic pressure correction amount of the minor loop is independently performed with respect to the each loop of the reduction map from the memorized turn-round point to the turn-round point.

Subsequently to the calculation of the hysteresis hydraulic pressure correction amount of the minor loop at step S406, at step S407, the minor loop hysteresis correction amounts of odd numbers are summed to determine a total hysteresis hydraulic pressure correction amount of the odd numbers, and the process proceeds to step S408.

Subsequently to the calculation of the odd-numbered total hysteresis hydraulic pressure correction amount at step S407, at step S408, clutch pressure correction control section 40 judges whether or not the initial turn-round point is "Fall". When the answer of step S408 is affirmative (YES) (the initial turn-round point is Fall), the process proceeds to step S409. When the answer of step S408 is negative (NO), (the initial turn-round point is Rise), the process proceeds to step S410.

Subsequently to the judgment that the initial turn-round point is Fall at step S408, at step S409, clutch pressure correction control section 40 sets the total hysteresis hydraulic pressure correction amount of the odd number in the minor loop to the minus direction, and the process proceeds to step S411.

Subsequently to the judgment that the initial turn-round point is Rise at step S408, at step S410, clutch pressure correction control section 40 sets the total hysteresis hydraulic pressure correction amount of the odd number in the minor loop to the plus direction, and the process proceeds to step S411.

Subsequently to the calculation of the provision of the sign of the total hysteresis hydraulic pressure correction amount of the odd number at step S409 or step S410, at step S411, clutch pressure correction control section 40 sums the minor loop hysteresis correction amounts of the even numbers, and sets this value to a total hysteresis hydraulic pressure correction amount of the even numbers, and the process proceeds to step S412.

Subsequently to the calculation of the even-numbered total hysteresis hydraulic pressure correction amount at step S411, at step S412, clutch pressure correction control section 40 judges whether or not the initial turn-round point is "Fall". When the answer of step S412 is affirmative (YES) (the initial turn-round point is Fall), the process proceeds to step S413. When the answer of step S412 is negative (NO) (the initial turn-round point is Rise), the process proceeds to step S414.

Subsequently to the judgment that the initial turn-round point is Fall at step S412, at step S413, clutch pressure correction control section 40 sets the total hysteresis hydraulic pressure correction amount of the even number in the minor loop to the plus direction, and the process proceeds to step S415.

Subsequently to the judgment that the initial turn-round point is Rise at step S412, at step S414, clutch pressure correction control section 40 sets the total hysteresis hydraulic pressure correction amount of the even number in the minor loop to the minus direction, and the process proceeds to step S415.

Subsequently to the calculation of the provision of the sign of the total hysteresis hydraulic pressure correction amount of the even number at step S413 or step S414, at step S415, clutch pressure correction control section 40 sums the total hysteresis hydraulic pressure correction amount of the odd number and the total hysteresis hydraulic pressure correction amount of the even number, and sets this value to a total hysteresis hydraulic pressure correction amount of the minor loop.

Subsequently to the judgment of the full loop at step S405 or the calculation of the total hysteresis hydraulic pressure correction amount of the minor loop at step S415, at step S416, clutch pressure correction control section 40 sums the total hysteresis hydraulic pressure correction amount of the minor loop and the neutral hysteresis correction amount of the full loop to determine a final hysteresis hydraulic pressure correction amount, and the process proceeds to RETURN.

Figure 4:
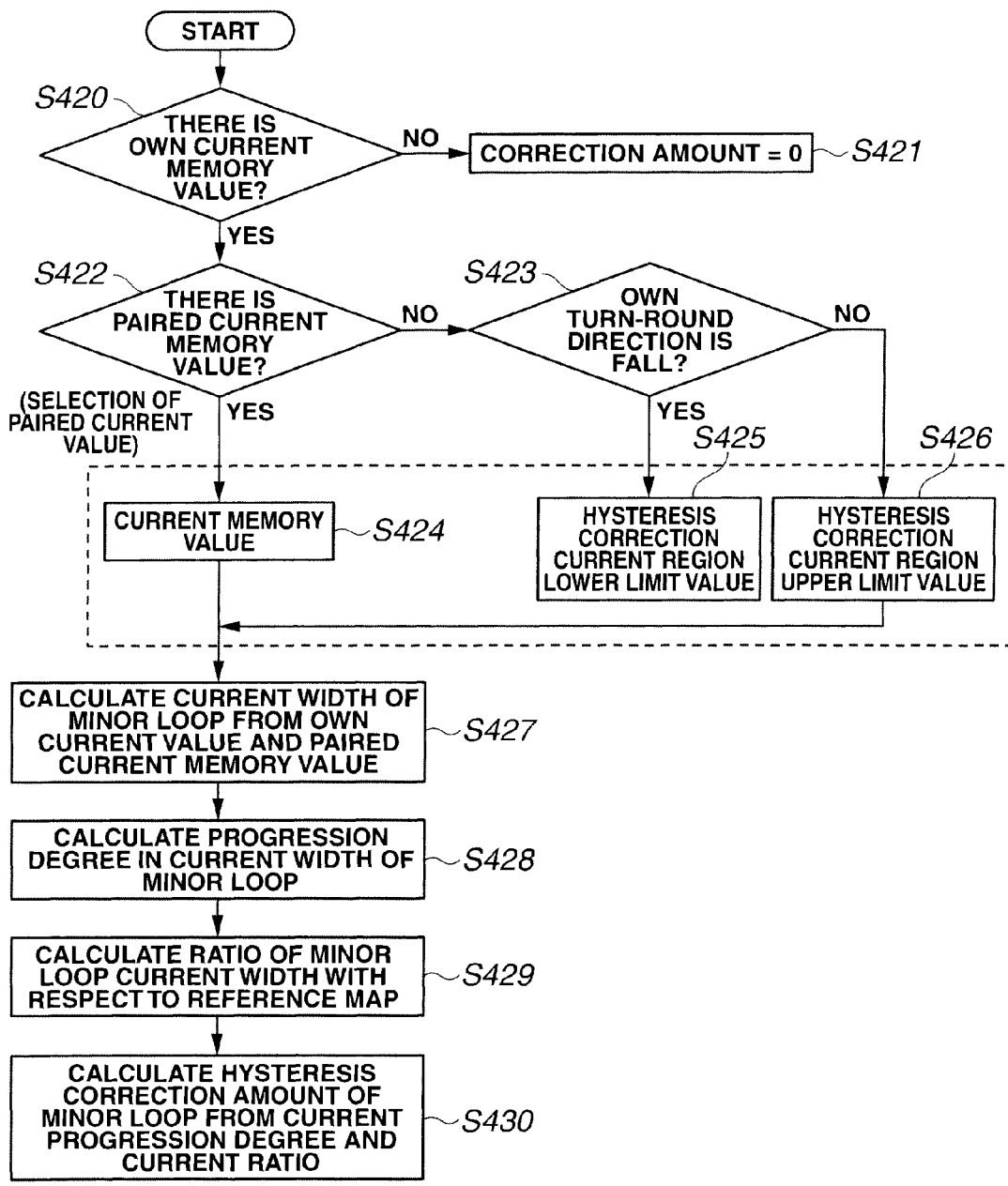
FIG. 4 is a flowchart showing a configuration and a flow of a hysteresis hydraulic pressure correction amount calculation of a minor loop during the hysteresis hydraulic pressure correction amount calculation of FIG. 3.

FIG. 4 is a flowchart showing a configuration and a flow of the hysteresis hydraulic pressure correction amount calculation of the minor loop during the hysteresis hydraulic correction amount calculation of FIG. 3. Hereinafter, steps of FIG. 4 are illustrated.

At step S420, it is judged whether or not there is an own turn-round point current memory value of the command current which is moved when entering the minor loop. When the answer of step S420 is affirmative (YES) (there is the turn-round point current memory value), the process proceeds to step S422. When the answer of step S421 is negative (NO) (there is no turn-round point current memory value), the process proceeds to step S421.

Subsequently to the judgment that there is no turn-round point current memory value at step S420, at step S421, the hysteresis hydraulic pressure correction amount of the minor loop is set to zero.

Subsequently to the judgment that there is the turn-round point current memory value at step S420, at step S422, it is judged whether or not there is a paired turn-round point current memory value. When the answer of step S422 is affirmative (YES) (there is a paired turn-round point current memory value), the process proceeds to step S424. When the answer of step S422 is negative (NO) (there is no paired turn-round point current memory value), the process proceeds to step S423.

Subsequently to the judgment that there is no paired turn-round point current memory value at step S422, at step S423, it is judged whether or not the turn-round direction of the command current itself which is moved in the minor loop is "Fall". When the answer of step S423 is affirmative (YES) (the turn-round direction is Fall), the process proceeds to step S425. When the answer of step S423 is negative (NO) (the turn-round direction is Rise), the process proceeds to step S426.

Subsequently to the judgment that there is no paired turn-round point current memory value at step S422, at step S424, the turn-round point current memory value is selected as the current value of the paired turn-round point, and the process proceeds to step S427.

Subsequently to the judgment that the turn-round direction is Fall at step S423, at step S425, a hysteresis correction current region lower limit value is selected as the current value of the paired turn-round point, and the process proceeds to step S427.

Subsequently to the judgment that the turn-round direction is Rise at step S423, at step S426, a hysteresis correction current region upper limit value is selected as the current value of the paired turn-round point, and the process proceeds to step S427.

Subsequently to the selection of the current value of the paired turn-round point at step S424, step S425 or step S426, at step S427, a current width of the minor loop is calculated from the turn-round point current memory value of the command current itself which is moved in the minor loop, and the paired turn-round point current memory value, and the process proceeds to step S428.

Subsequently to the calculation of the current width of the minor loop at step S427, at step S428, the current progression degree in the current width of the minor loop is calculated, and the process proceeds to step S429.

Subsequently to the calculation of the current progression degree at step S428, at step S429, a current ratio of the current width of the minor loop to the maximum current width of the reference map is calculated, and the process proceeds to step S430.

Subsequently to the calculation of the current ratio at step S429, at step S430, a reduction map obtained by reducing the reference map in a homothetic manner by a magnitude of the current ratio is formed based on the current ratio of the minor loop. The hysteresis hydraulic pressure correction amount of the minor loop is calculated by using the reduction map and the current progression degree at step S428.

Figure 6:
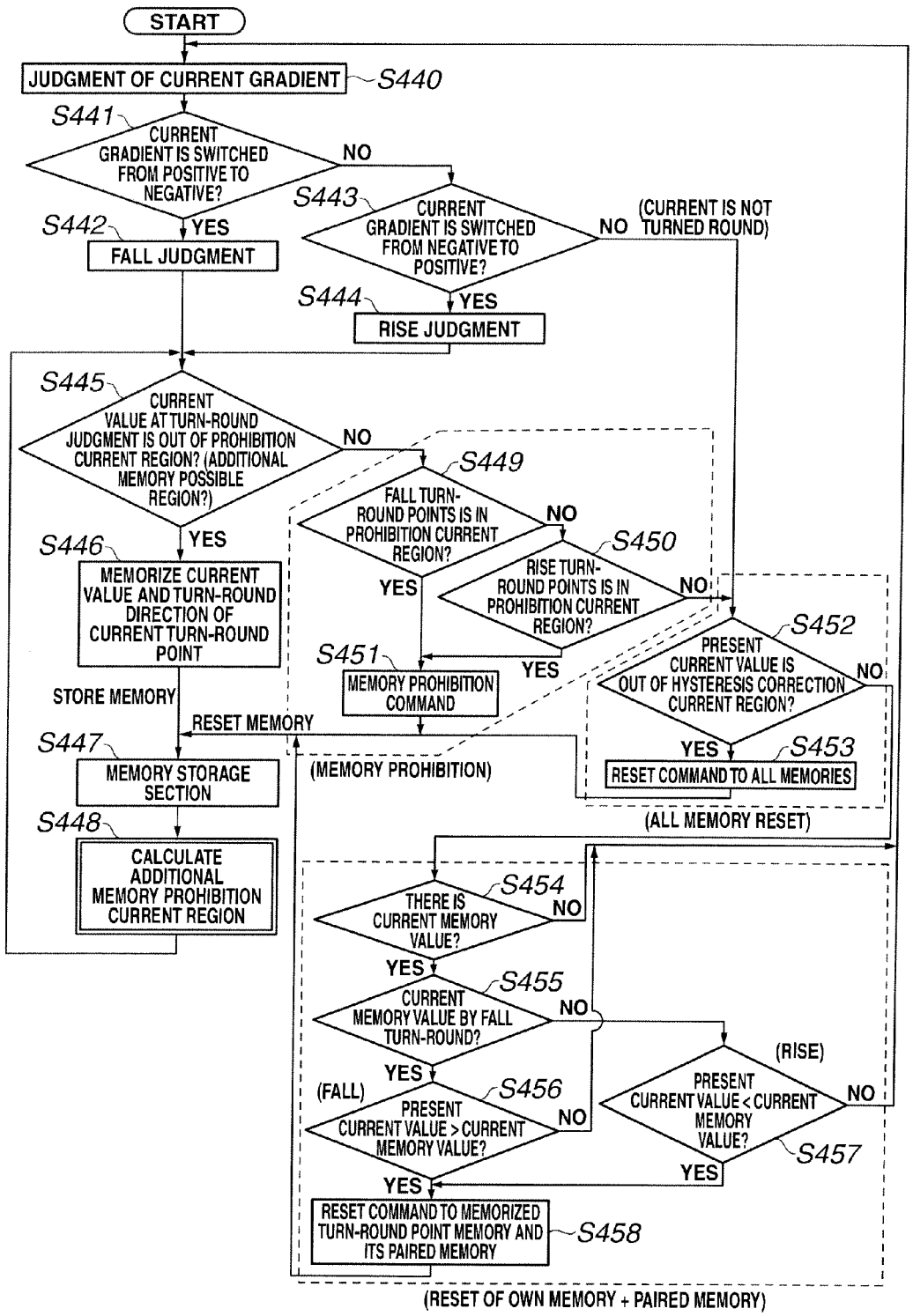
FIG. 6 is a flowchart showing a configuration and a flow of set/reset operation of the turn-round point memory which is performed concurrently with the hysteresis hydraulic pressure correction amount calculation of FIG. 3.

FIG. 6 is a flowchart (turn-round point memory control section) showing a configuration and a flow of set/reset operation of a turn-round point memory which is performed simultaneously with the hysteresis hydraulic pressure correction amount calculation of FIG. 3. Hereinafter, steps of FIG. 6 are illustrated.

At step S440, the current gradient of the command current is judged, and the process proceeds to step S441.

Subsequently to the judgment of the gradient of the command current at step S440, at step S441, it is judged whether or not the current gradient is switched from the positive to the negative. When the answer of step S441 is affirmative (YES) (the current gradient is switched from the positive to the negative), the process proceeds to step S442. When the answer of step S441 is negative (NO) (a case other than a case in which the current gradient is switched from the positive to the negative), the process proceeds to step S443.

Subsequently to the judgment that the current gradient is switched from the positive to the negative at step S441, at step S442, "Fall" is judged, and the process proceeds to step S445.

Subsequently to the judgment of the case other than the case in which the current gradient is switched from the positive to the negative at step S441, at step 443, it is judged whether or not the current gradient is switched from the negative to the positive. When the answer of step S443 is affirmative (YES), the process proceeds to step S444. When the answer of step S443 is negative (NO) (a case other than a case in which the current gradient is switched from the negative to the positive), the process proceeds to step S452.

Subsequently to the judgment that the current gradient is switched from the negative to the positive at step S443, at step S444, "Rise" is judged, and the process proceeds to step S445.

Subsequently to the "Fall" judgment at step S442, the "Rise" judgment at step S444, or the calculation of the additional memory prohibition current region at step S448, at step S445, it is judged whether or not the current value at the turn-round judgment is outside (out of) the additional memory prohibition current region (=additional memory possible region). When the answer of step S445 is affirmative (YES) (the current value at the turn-round judgment is outside the additional memory prohibition region), the process proceeds to step S446. When the answer of step S445 is negative (NO) (the current value at the turn-round judgment is within the additional memory prohibition current region), the process proceeds to step S449.

Subsequently to the judgment that the current value at the turn-round judgment is outside the additional memory prohibition current region at step S445, at step S446, a set command to memory (store) "the current value" and "the turn-round direction" at the current turn-round point is outputted, and the process proceeds to step S447.

Subsequently to the set command of the current turn-round point at step S446 or the reset command of the current turn-round point at steps S451, S453, and S458, at step S447, "the current value" and "the turn-round direction" at the current turn-round point are stored in the memory in case of the set command, the information memorization is prohibited in case of the prohibition command, and the stored information is deleted in case of the reset command. Subsequently to step S447, the process proceeds to step S448.

Subsequently to the memory storage at step S447, at step S448, the additional memory prohibition current region is calculated in accordance with the flowchart of FIG. 7, and the process returns to step S445.

Subsequently to the judgment that the current value at the turn-round judgment is within the additional memory prohibition current region at step S445, at step S449, it is judged whether or not the turn-round is in the additional memory prohibiting current region of the Fall turn-round point. When the answer of step S449 is affirmative (YES) (the turn-round in the Fall prohibition current region), the process proceeds to step S451. When the answer of step S449 is negative (NO) (the turn-round in a region other than the Fall prohibition current region), the process proceeds to step S450.

Subsequently to the judgment of the turn-round in the region other than the Fall prohibition current region at step S449, at step S450, it is judged whether or not the turn-round is in the additional memory prohibiting current region of the Rise turn-round point. When the answer of step S450 is affirmative (YES) (the turn-round in the Rise prohibition current region), the process proceeds to step S451. When the answer of step S450 is negative (NO) (the turn-round in the region other than the Rise prohibition current region), the process proceeds to step S452.

Subsequently to the judgment of the turn-round in the Fall prohibition current region at step S449, or the judgment of the turn-round in the Rise prohibition current region at step S450, at step S451, the memory prohibition command to prohibit the information memory of the turn-round point is outputted, and the process proceeds to step S447.

Subsequently to the judgment that the current is not turned back at step S443, or the judgment that the turn-round is turned back in the region other than the Rise prohibiting current region at step S450, at step S452, it is judged whether or not the present current value is outside the hysteresis correction current region, that is, the present current value reaches a current value (for example, 795 mA) just before the maximum current value (800 mA) along the full loop of the reference map, or the present current value reaches a current value (for example, 5 mA) just before the minimum current value by returning from the minor loop to the full loop. When the answer of step S452 is affirmative (YES) (outside the hysteresis correction current region), the process proceeds to step S453. When the answer of step S452 is negative (NO) (within the hysteresis correction current region), the process proceeds to step S454.

Subsequently to the judgment that the present current value is outside the hysteresis correction current region at step S452, at step S453, the reset command to delete the information stored in the all stored memories is outputted, and the process proceeds to step S447.

Subsequently to the judgment that the present current value is within the hysteresis correction current region at step S452, at step S454, it is judged whether or not there is the current memory value. When the answer of step S454 is affirmative (YES) (there is the current memory value), the process proceeds to step S455. When the answer of step S454 is negative (NO) (no current memory value), the process returns to step S440.

Subsequently to the judgment that there is the current memory value at step S454, at step S455, it is judged whether or not it is the current memory value by the Fall turn-round. When the answer of step S455 is affirmative (YES) (the Fall turn-round current memory value), the process proceeds to step S456. When the answer of step S455 is negative (NO) (the Rise turn-round current memory value), the process proceeds to step S457.

Subsequently to the judgment of the Fall turn-round current memory value at step S455, at step S456, it is judged whether or not the present current value is greater than the current memory value. When the answer of step S456 is affirmative (YES) (the present current value>the current memory value), the process proceeds to step S458. When the answer of step S456 is negative (NO) (the present current value≤the current memory value), the process returns to step S440.

Subsequently to the judgment of the Rise turn-round current memory value at step S455, at step S457, it is judged whether or not the present current value is smaller than the current memory value. When the answer of step S457 is affirmative (YES) (the present current value<the current memory value), the process proceeds to step S458. When the answer of step S457 is negative (NO) (the present current value≥the current memory value), the process returns to step S440.

Subsequently to the judgment of the present current value>the current memory value at the Fall at step S456, or the judgment of the present current value<the current memory value at the Rise at step S457, at step S458, the reset command to delete the information stored in the past turn-round point memory and the paired memory which is paired with the past turn-round point memory which are stored, is outputted, based on the judgment that the current returns to the past turn-round point, passes through the past turn-round point, and is moved in the full loop direction (moves out from the minor loop). Subsequently to step S458, the process proceeds to step S447.

Figure 7:
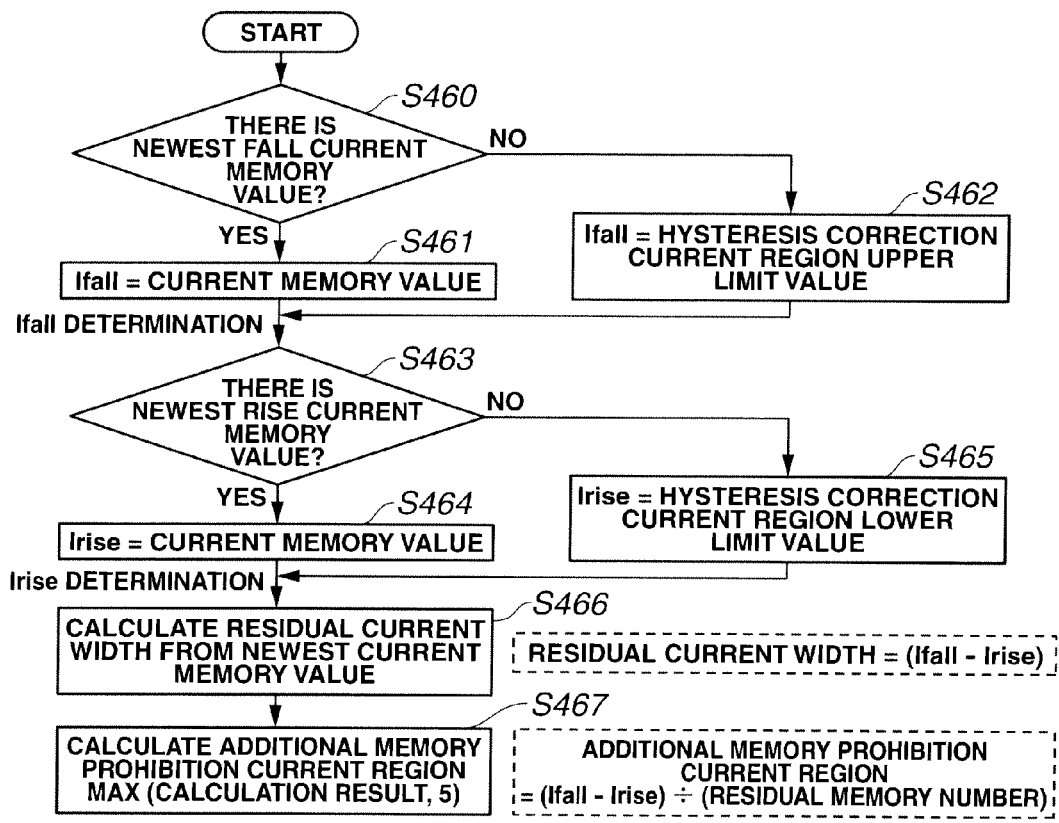
FIG. 7 is a flowchart showing a configuration and a flow of an additional memory prohibition current region calculation performed during the set/reset operation of the turn-round point memory of FIG. 6.

FIG. 7 is a flowchart showing a configuration and a flow of the additional memory prohibition current region calculation performed during the set/reset operation of the turn-round point memory in FIG. 6 Hereinafter, steps of FIG. 7 are illustrated.

At step S460, it is judged whether or not there is a newest Fall current memory value. When the answer of step S460 is affirmative (YES) (there is the newest Fall current memory value), the process proceeds to step S461. When the answer of step S460 is negative (NO) (no newest Fall current memory value), the process proceeds to step S462.

Subsequently to the judgment that there is the newest Fall current memory value at step S460, at step S461, a turn-round point current Ifall having the current gradient from the positive to the negative is set to the newest Fall current memory value, and the process proceeds to step S463.

Subsequently to the judgment that there is no newest Fall current memory value at step S460, at step S462, the turn-round point current Ifall having the current gradient from the positive to the negative is set to the hysteresis correction current region upper limit value, and the process proceeds to step S463.

Subsequently to the determination of Ifall at step S461 or step S462, at step S463, it is judged whether or not there is the newest Rise current memory value. When the answer of step S463 is affirmative (YES) (there is the newest Rise current memory value), the process proceeds to step S464. When the answer of step S463 is negative (NO) (there is no newest Rise current memory value), the process proceeds to step S465.

Subsequently to the judgment that there is the newest Rise current memory value at step S463, at step S464, the turn-round point current Irise having the current gradient from the negative to the positive is set to the newest Rise current memory value, and the process proceeds to step S466.

Subsequently to the judgment that there is no newest Rise current memory value at step S463, at step S465, the turn-round point current Irise having the current gradient from the negative to the positive is set to the hysteresis correction current region lower limit value, and the process proceeds to step S466.

Subsequently to the determination of Irise at step S464 or step S465, at step S466, a residual current width (=Ifall−Irise) is calculated from the newest current memory value (Ifall, Irise), and the process proceeds to step S467.

Subsequently to the calculation of the residual current width at step S466, at step S467, the additional memory prohibition current region is calculated by the following equation.

The additional memory prohibition current region= (Ifall−Irise)/(the residual memory number+1)

Besides, when the calculation result is larger than 5, the calculation result is set to the additional memory prohibition current region. When the calculation result is equal to or smaller than 5, 5 are set to the additional memory prohibiting current region. In this way, the minimum additional memory prohibition current region is provided.

Next, operations are illustrated. First, "problems of the hydraulic pressure control solenoid valve" are illustrated. Next, the operations of the hydraulic pressure control apparatus according to the first embodiment are illustrated by "the correspondence between principle of the generation of the hysteresis hydraulic pressure and the logic", "the clutch pressure correction control operation", "the hysteresis hydraulic pressure correction amount calculation operation", and "the turn-round point memory control operation".

[Problems of Hydraulic Pressure Control Solenoid Valve] First, in case of the solenoid valve, a target hydraulic characteristic with respect to the actual current is to move on the same one characteristic line even when the actual current increases or decreases. However, in the solenoid valve, the residual electromagnetic force is generated in the solenoid, so that the balancing point is varied. With this, the hysteresis is generated in the variation characteristic of the actual current and the actual pressure (the command pressure). That is, when the actual current is increased, the actual pressure is moved in a state lower than the target hydraulic pressure with respect to the increase of the actual current, as shown in the hydraulic pressure increase side characteristic of FIG. 5. When the actual current is decreased, the actual pressure is moved in a state higher than the target hydraulic pressure with respect to the decrease of the actual current, as shown in the hydraulic pressure decrease side characteristic of FIG. 5. Accordingly, there is a hysteresis deviation amount between the target hydraulic pressure and the target current value. On the hydraulic pressure increase side, it is not possible to obtain the target hydraulic pressure if the actual current value is not increased. Conversely, on the hydraulic pressure decrease side, it is not possible to obtain the target hydraulic pressure if the actual current value is not decreased.

The hysteresis amount which is the hysteresis deviation amount becomes small when the command current value at the turn-round point at which the current command is turned back from the increasing direction to the decreasing direction is low. The hysteresis amount becomes large when the command current value at the turn-round point is high. That is, the hysteresis amount shows different characteristic in accordance with the turn-round position and the used hydraulic pressure region.

On the other hand, for example, Japanese Patent Application Publication No. 2003-294126 shows a comparative example in which the hysteresis correction of the command current is performed by using the current average value calculated based on the actual measured map obtained from the actual measured value of the output pressure at each current value when the output pressure is increased to the maximum value and then the current value is decreased. In this comparative example, when the command current to the solenoid valve is turned back in the midstream before the hydraulic pressure is increased to the maximum pressure, the hysteresis hydraulic pressure correction amount includes a deviation amount due to the characteristic that the hysteresis amounts are different in accordance with the turn-round position and the used hydraulic pressure region. Accordingly, it is not possible to obtain the relationship between the command current and the output pressure at the high accuracy. With this, the control accuracy is deteriorated.

Moreover, when the hydraulic pressure control to continue any number of times (many times) of the turn-round of the command current is performed, the deviation amount of the hysteresis hydraulic pressure correction amount is accumulated in accordance with the frequency of the turn-round. The hysteresis hydraulic pressure correction amount is gradually deviated from the correct hysteresis hydraulic pressure correction amount. With this, the accuracy of the hysteresis hydraulic pressure correction amount is deteriorated. For example, when the frictional engagement element is slip-engaged and the torque to be transmitted through the frictional engagement element to maintain the slip engagement state is controlled to increase or decrease to become the request torque according to the accelerator operation by the driver, the hydraulic pressure control to continue many times of the turn-round of the command current is performed. The deviation amounts of the hysteresis hydraulic pressure correction amount are accumulated in accordance with the frequency of the turn-round.

[Correspondence between Principle of Generation of Hysteresis Hydraulic Pressure and Logic] The present inventor ascertained that the hysteresis hydraulic pressure is generated in accordance with what principles, and found out the following principles of the generation of the hysteresis hydraulic pressure.

Figure 8:
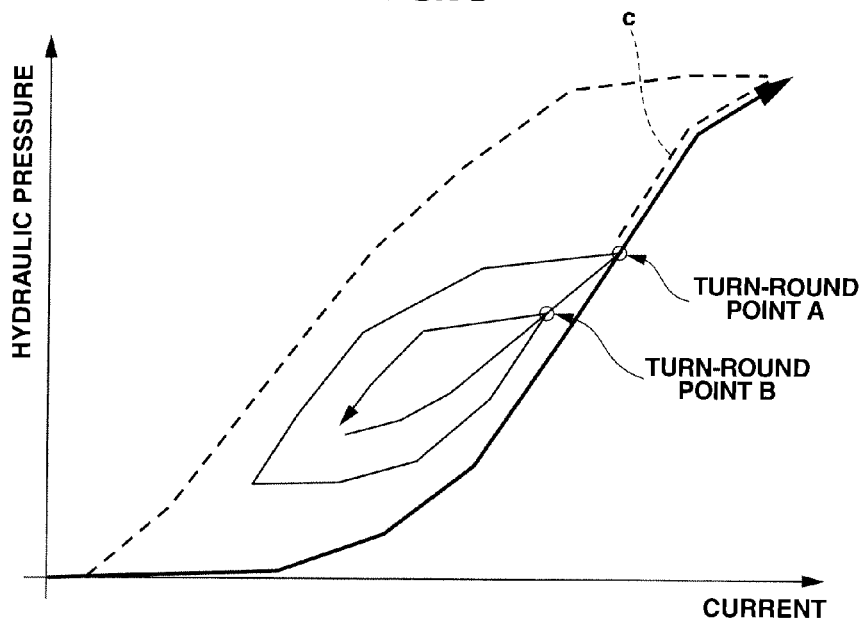
FIG. 8 is a characteristic view showing a characteristic of the hydraulic pressure—the current, and midstream turn-round of the command current for illustrating a principle of the generation of the hysteresis.
Figure 9:
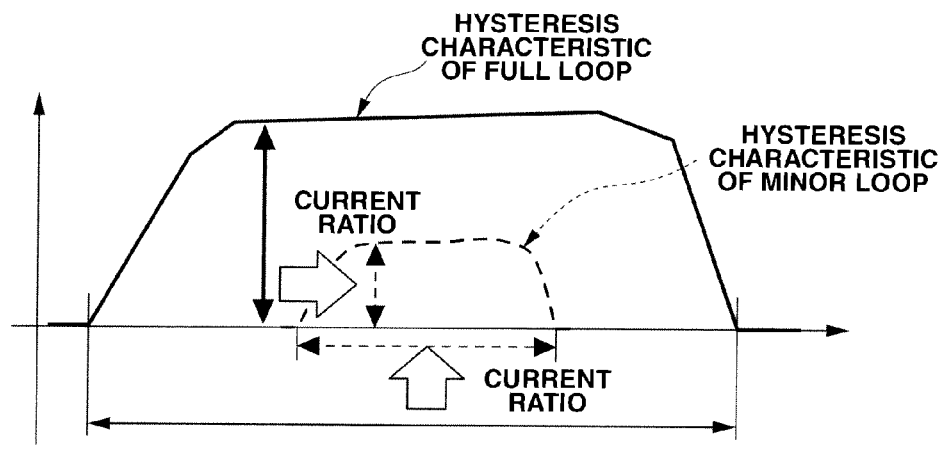
FIG. 9 is a view illustrating the hysteresis characteristic, and showing that the hysteresis characteristic of the minor loop becomes a similar figure obtained by reducing the hysteresis characteristic of the full loop by the current ratio.

1. The turn-round points are continued inside the full loop to form the minor loop. Then, when it is departed from the loop, it necessary goes through the turn round point as shown in the turn round points A and B of FIG. 8 which are represented by O.
2. When it is turned back from the static characteristic by the full loop to form the minor loop, a characteristic after the initial turn round point A is along the static characteristic of the full loop, as shown by a bold dotted line C of FIG. 8.
3. The hysteresis characteristic of the minor loop is a similar figure which is obtained by reducing the hysteresis characteristic of the full loop by the current ratio, as shown in FIG. 9.

The logic of the hysteresis hydraulic pressure correction is determined by the following manner based on the above-described principles of the generation of the hysteresis hydraulic pressure.

Figure 10:
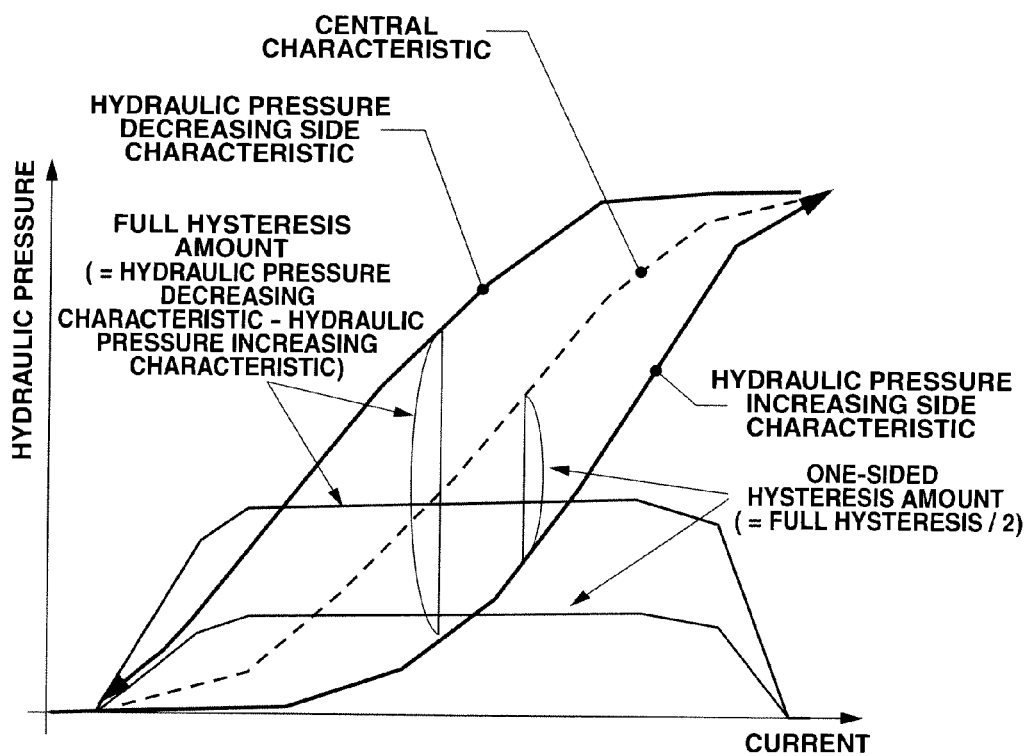
FIG. 10 is a characteristic view showing determination of the hysteresis hydraulic pressure correction amount by setting, as a target characteristic, a central characteristic of the full hysteresis characteristic of the hydraulic pressure—the current.
Figure 11A:
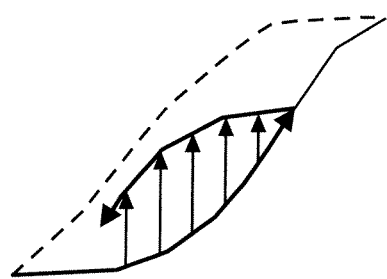
FIG. 11A is a view showing a hydraulic pressure variation amount with respect to a pressure increasing characteristic when it enters the minor loop.
Figure 11B:
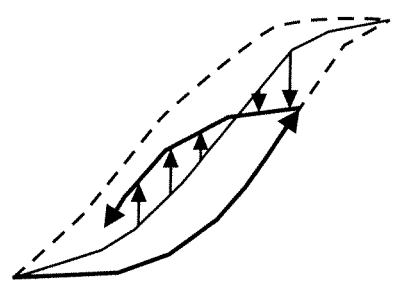
FIG. 11B is a view showing a hydraulic pressure variation amount with respect to a central characteristic when it enters the minor loop.

1. It has the full hysteresis characteristic as the hysteresis correction reference map. The map is reduced in accordance with the current ratio, and the command pressure is corrected. The reduction map is formed from the memorized turn round point. In a case in which the minor loop continues in the inside, the plurality of maps are formed. The hysteresis hydraulic pressure correction amount is determined by the summation of the maps.
2. As shown in FIG. 10, the target characteristic is the central characteristic of the full hysteresis characteristic. For example, when it goes through the initial turn round point, and returns to the static characteristic, the only one side hysteresis amount (=the full hysteresis portion/2) is corrected.
3. In principle, the current of the turn-round point is memorized in the memory. When the turn round point is continued, the hysteresis hydraulic pressure correction amount is calculated from the plurality of the turn round point memories.

However, as to the turn round point memory of the logic, the memory number which can be prepared is finite. It is not possible to innumerably increase the turn round point memory. Accordingly, the logic includes following countermeasures for suppressing the memory number.

Countermeasure 1: When it goes out of the minor loop, there is no need for the turn round point memory of the inside minor loop. Accordingly, the upper and lower memories are deleted.

Countermeasure 2: When it is newly turned back at a portion near the turn round point memory already memorized to further form the loop within the minor loop, the memory is prohibited.

Countermeasure 3: When the current value is outside the hysteresis correction current region by returning from the minor loop to the full loop, there is no need for all of the turn round point memories of the minor loop. Accordingly, all of the turn round point memory are deleted. When the countermeasure 2 is performed, the additional memory prohibition current region is set. This region is determined by a value obtained by dividing the residual memory number of the previously-prepared memory number by the hysteresis correction upper and lower limit current region. This value is set to a predetermined additional memory prohibition current region. The current within the predetermined region from the turn round point memory is not memorized.

[Clutch Pressure Correction Control Operation]

In the first embodiment, the clutch pressure correction method which obtains the clutch command pressure by adding the SOL time degradation correction amount, the hysteresis hydraulic pressure correction amount, and the PS learning amount to the clutch pressure command value is employed. Hereinafter, the clutch pressure correction control operation is illustrated with reference to FIG. 2.

The clutch pressure correction control operation is performed in a process of a block B44, a block B45, a block B46, a block B47, a block B48, and a block B49 in the control block diagram of FIG. 2.

That is, block B44 calculates the clutch command pressure which is obtained by correcting the clutch pressure command value by adding the SOL time degradation correction amount of block B41, the hysteresis hydraulic pressure correction amount of block B42, and the PS learning amount of block B43, to the clutch pressure command value (the desired hydraulic pressure). The next block B45 receives the clutch command pressure from block B44, and converts the clutch command pressure to the SOL command pressure by using the command pressure conversion map and so on. The next block B46 receives the SOL command pressure from block B45, performs the hydraulic pressure temperature correction operation, and outputs the temperature correction amount. The next block B47 calculates the corrected SOL command pressure by adding the SOL command pressure from block B45, and the temperature correction amount from block B46. The next block B48 receives the corrected SOL command pressure from block B47, and coverts the corrected SOL command pressure to the command current value by using the PI current conversion map and so on. The next block B49 converts the command current value from block B48, to the actual current (solenoid current $I_{SOL}$) by the solenoid driving circuit.

The actual current (solenoid current $I_{SOL}$) from block B49 is applied to solenoid coil 21 of linear solenoid valve 2. In this case, block B50 monitors the actual current from block B49, and performs the feedback correction necessary for the command current value from block B48.

In the clutch pressure correction control, block B41 calculates the SOL time degradation correction amount. The learning correction amount is divided into the initial learning amount due to the individual variation, and the time degradation amount due to the ex-post degradation in the control mechanism. Block B41 calculates the SOL time degradation correction amount based on the command current value and the time degradation progression degree and which is indicated by a difference between the PS learning region correction amount and the PS initial learning amount. Accordingly, it is possible to dissolve the influence of the ex-post time degradation generated in the control mechanism.

Block B42 to calculate the hysteresis hydraulic pressure correction amount has the full hysteresis characteristic drawing the full loop, as the reference map. Block B42 forms the plurality of the reduction maps which are obtained by reducing the reference map in accordance with the turn round position, respectively, in the minor loops from the past to the present time when the minor loop in which the command current is turned back in the midstream of the full loop region is continued. Block B42 determines the final hysteresis hydraulic pressure correction amount by the sum of the hysteresis hydraulic pressure correction amounts obtained by the plurality of the reduction maps in the same command current position. Accordingly, it is possible to perform the hysteresis correction to dissolve the hysteresis error in accordance with the turn round position and the turn round frequency of solenoid current $I_{SOL}$ to linear solenoid valve 2.

Moreover, block B43 to calculate the PS learning amount corresponding to the AT oil temperature memorizes the PS learning amounts in the sensed AT oil temperature regions, separately. The learning region SOL time degradation amount is calculated in the set oil temperature region on which the sensed AT oil temperature is reflected. The PS learning amount is determined by the difference between the PS learning amount and the learning region SOL time degradation amount. Accordingly, it is possible to perform the correction to dissolve the deviation amount by the variation of the AT oil temperature (the variation of the viscosity of the hydraulic fluid).

[Hysteresis Hydraulic Pressure Correction Amount Calculation Operation] In the first embodiment, as described in the principle of the generation of the hysteresis hydraulic pressure, the hysteresis characteristic of the minor loop is the similar figure which is obtained by reducing the hysteresis characteristic of the full loop by the current ratio. By utilizing this, the method to presume and calculate the hysteresis hydraulic pressure correction amount is employed. Hereinafter, the hysteresis hydraulic pressure correction amount calculation operation is illustrated with reference to the flowcharts of FIGS. 3 and 4, and the time chart of FIGS. 12 and 13.

Figure 12:
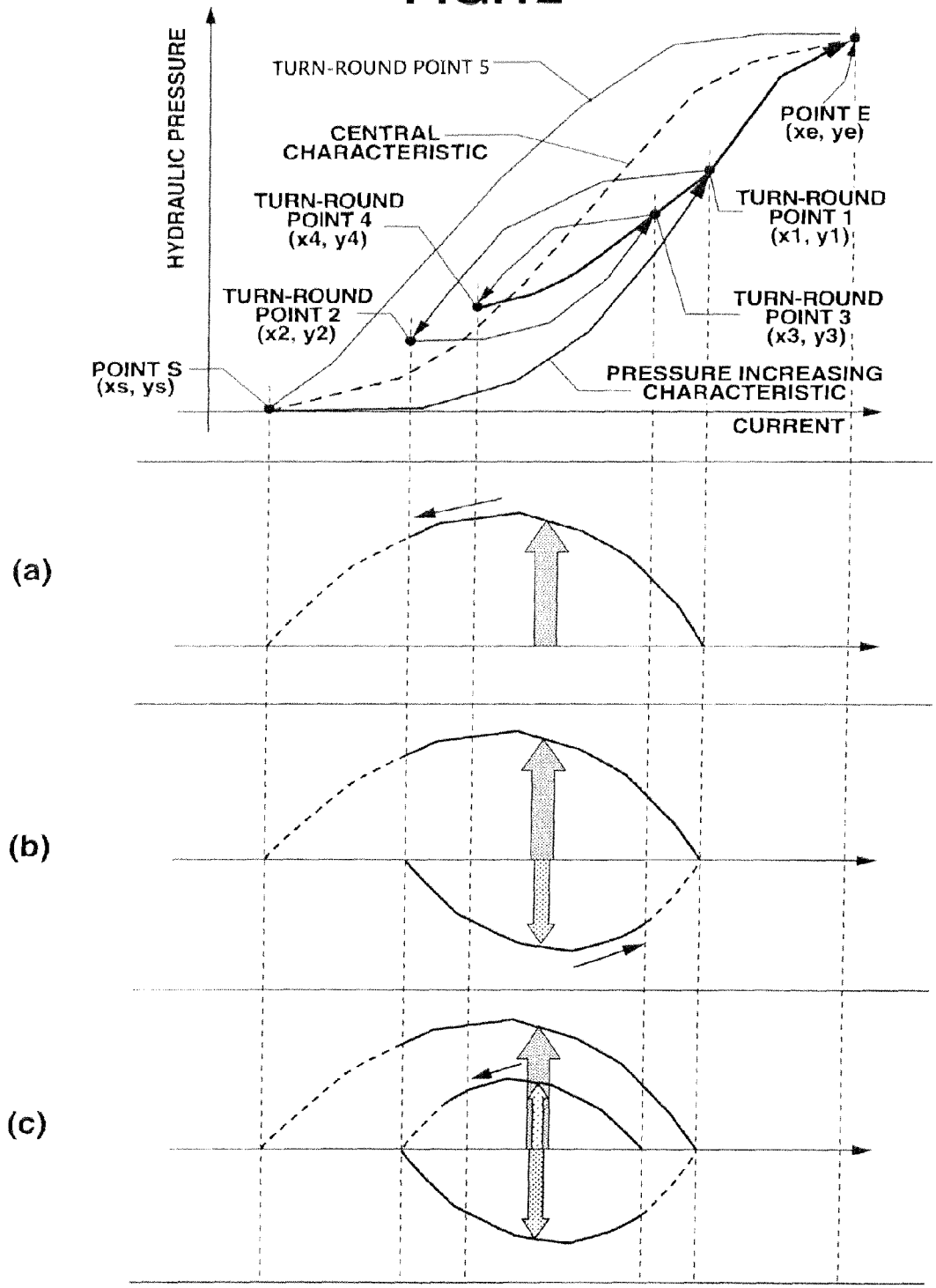
FIG. 12 is an illustrative view showing the calculation of the hysteresis hydraulic pressure correction amount when it enters the minor loop by turning back from the pressure increasing characteristic, and the turn-round are continued from a turn-round point 1 to a turn-round point 4.
Figure 13:
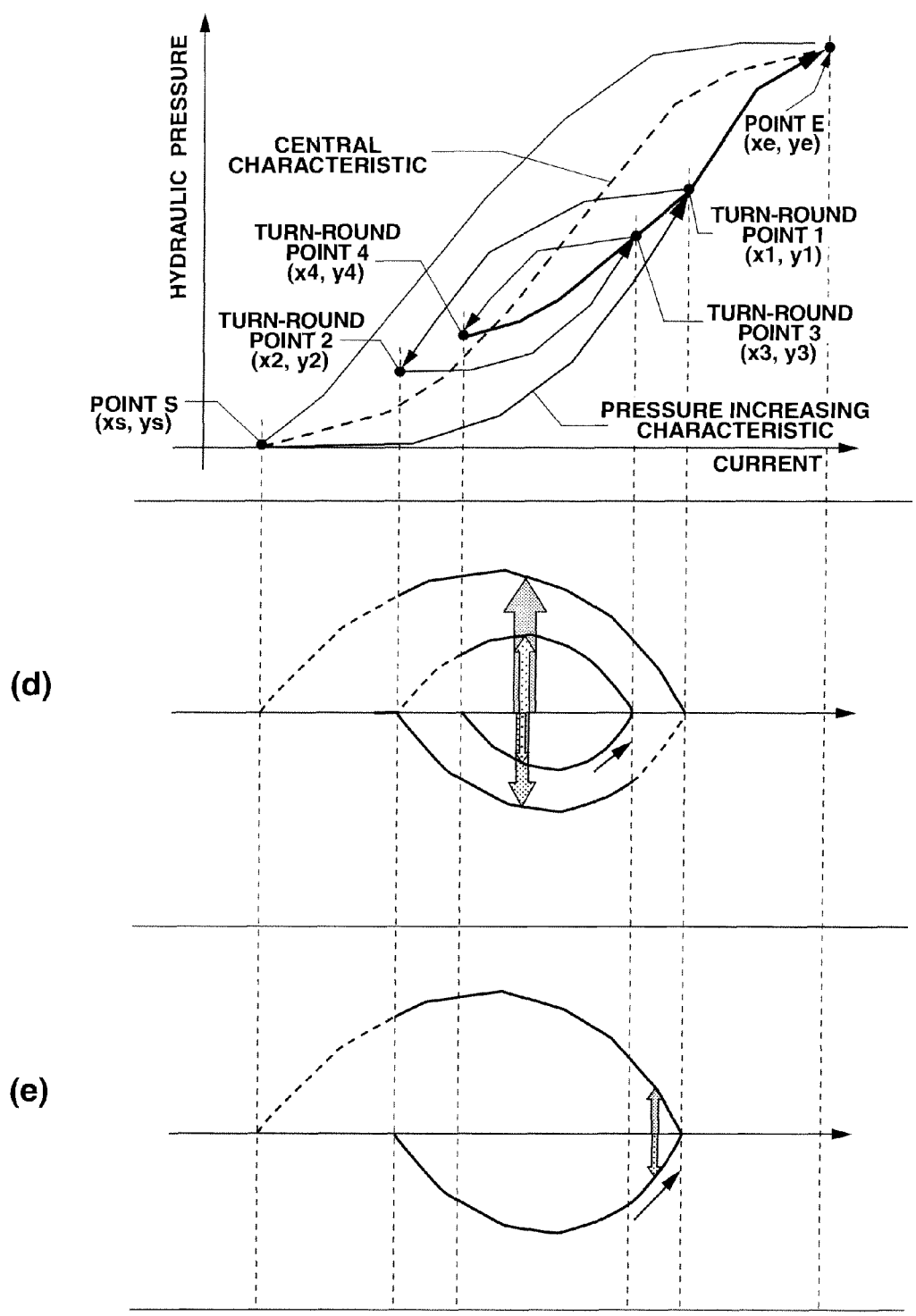
FIG. 13 is an illustrative view showing the calculation of the hysteresis hydraulic pressure correction amount when it enters the minor loop by turning back from the pressure increasing characteristic, the turn-round are continued, and it returns from turn-round point 4 through turn-round point 3 to turn-round point 1 of the full loop.

As shown in upper portions of FIGS. 12 and 13, the command current is moved from a point S (xs, ys) along the pressure increasing characteristic, and enters the minor loop from a turn round point 1 (x1, y1). Then, in the minor loop, the command current is moved through turn round point 1 (x1, y1), a turn round point 2 (x2, y2), a turn round point 3 (x3, y3), and a turn round point 4 (x4, y4) to draw the loop. Then, the command current passes through turn round point 4 (x4, y4) and turn round point 3 (x3, y3), and returns to turn round point 1 (x1, y1) on the full loop. Then, the command current is moved to an upper limit value point E (xe, ye) along the full loop. This example of the movement of the command current is illustrated below.

(1) point S (xs, ys) turn round point 1 (x1, y1)

In this case, a flow of step S400→step S401→step S402→step S403→step S405→step S416 in the flowchart of FIG. 3 is repeated. In this region of point S (xs, ys)→turn round point 1 (x1, y1), the characteristic becomes equal to the pressure increasing characteristic of the full hysteresis characteristic. Accordingly, the hysteresis hydraulic pressure correction amount of the minor loop is zero. Accordingly, at step S416, the final hysteresis hydraulic pressure correction amount of solenoid pressure $P_{SOL}$ is calculated by the neutral hysteresis correction amount of the full loop.

(2) turn round point 1 (x1, y1) turn round point 2 (x2, y2)

First, a flow of step S400→step S401→step S402→step S403→step S405 in the flowchart of FIG. 3 is repeated. The neutral hysteresis correction amount of the full loop is calculated. Subsequently to step S405, the process proceeds to step S406-1 to perform the correction amount calculation No. 1 of the minor loop. At step S406-1, the current of turn round point 1 is memorized at a time when it reaches turn round point 1 (x1, y1). The process proceeds along a flow of step S420→step S422→step S423→step S425→step S427→step S428→step S429→step S430 in the flowchart of FIG. 4. At step S430, the hysteresis correction amount of the minor loop is calculated based on the current progression degree, and the reduction map which is obtained by reducing the reference map of the full loop to return from turn round point 1 (x1, y1) to point S (xs, ys). Then, a flow of step S406-1→step S407→step S408→step S409→step S411→step S412→step S413→step S415→step S416 in the flowchart of FIG. 3 is repeated. In this region of turn round point 1 (x1, y1)→turn round point 2 (x2, y2), the hysteresis hydraulic pressure correction amount of the minor loop becomes the hysteresis correction amount of the first minor loop. Accordingly, at step S416, the final hysteresis hydraulic pressure correction amount of solenoid pressure $P_{SOL}$ is calculated by summation of the neutral hysteresis correction amount of the full loop, and the hysteresis correction amount in the first minor loop in the position of the same current progression degree.

(3) turn round point 2 (x2, y2)→turn round point 3 (x3, y3)

First, the process proceeds along a flow of step S400→step S401→step S402→step S403→step S405 in the flowchart of FIG. 3. The neutral hysteresis correction amount of the full loop is calculated.

Subsequently to step S405, the process proceeds to step S406-1 to perform the correction amount calculation No1 of the minor loop, and step S406-2 to perform the correction amount calculation No. 2 of the minor loop. At step S406-2, the current of turn round point 2 is memorized when it reaches turn round point 2 (x2, y2). Then, the process proceeds along a flow of step S420→step S422→step S424→step S427→step S428→step S429→step S430 in the flowchart of FIG. 4. At step S430, as shown in FIG. 12(*b*), a paired turn round point of turn round point 2 (x2, y2) is set to turn round point 1 (x1, y1). The hysteresis correction amount of the minor loop is calculated based on the current progression degree, and the reduction map which is obtained by reducing the reference map of the full loop to return from turn round point 2 (x2, y2) to turn round point 1 (x1, y1).

Then, a flow of step S406-1→step S406-2→step S407→step S408→step S409→step S411→step S412→step S413→step S415→step S416 is repeated in the flowchart of FIG. 3. In this region of turn round point (x2, y2)→turn round point (x3, y3), the hysteresis hydraulic pressure correction amount of the minor loop becomes the hysteresis correction amount (the minus direction) of the first minor loop, and the hysteresis correction amount (the plus direction) of the second minor loop. Accordingly, at step S416, the final hysteresis hydraulic pressure correction amount of solenoid pressure $P_{SOL}$ is calculated by the summation of the neutral hysteresis correction amount of the full loop, the hysteresis correction amount of the first minor loop, and the hysteresis correction amount of the second minor loop in the position of the same current progression degree.

(4) (turn round point 3 (x3, y3)→turn round point (x4, y4)

First, the process proceeds along a flow of step S400→step S401→step S402→step S403→step S405 in the flowchart of FIG. 3. The neutral hysteresis correction amount of the full loop is calculated.

Subsequently to step S405, the process proceeds to step S406-1 to perform the correction amount calculation No1, step S406-2 to perform the correction amount calculation No2 of the minor loop, and step S406-3 to perform the correction amount calculation No. 3 of the minor loop. At step S406-3, the current of turn round point 3 is memorized when it reaches the turn round point (x3, y3). The process proceeds along a flow of step S420→step S422→step S424→step S427→step S428→step S429→step S430 in the flowchart of FIG. 4. At step S430, as shown in FIG. 12(*c*), a paired turn round point of turn round point 3 (x3, y3) is set to turn round point 2 (x2, y2). The hysteresis correction amount of the minor loop is calculated based on the current progression degree, and the reduction map which is obtained by reducing the reference map of the full loop to return from turn round point 3 (x3, y3) to turn round point (x2, y2). Then, the process repeats a flow of step S406-1→step S406-2→step S406-3→step S407→step S408→step S409→step S411→step S412→step S413→step S415→step S416 in the flowchart of FIG. 3. In this region of turn round point 3 (x3, y3)→turn round point 4 (x4, y4), the hysteresis hydraulic pressure correction amount of the minor loop becomes the hysteresis correction amount of the first minor loop (the minus direction), the hysteresis correction amount of the second minor loop (the plus direction), and the hysteresis correction amount of the third minor loop (the minus direction).

Accordingly, at step S416, the final hysteresis hydraulic pressure correction amount of solenoid pressure $P_{SOL}$ is calculated by summation of the neutral hysteresis correction amount of the full loop, the hysteresis correction amount of the first minor loop, the hysteresis correction amount of the second minor loop, and the hysteresis correction amount of the third minor loop in the position of the same current progression degree.

(5) turn round point 4 (x4, y4)→turn round point 3 (x3, y3)

First, the process proceeds along a flow of step S400→step S401→step S402→step S403→step S405 in the flowchart of FIG. 3. The neutral hysteresis correction amount of the full loop is calculated.

Subsequently to step S405, the process proceeds to step S406-1 to perform the correction amount calculation No. 1 of the minor loop, step S406-2 to perform correction amount calculation No. 2 of the minor loop, step S406-3 to perform correction amount calculation No. 3, and step S406-4 to perform correction amount calculation No. 4 of the minor loop. At step S406-4, the current of turn round point 4 is memorized when it reaches turn round point 4 (x4, y4). Then, the process proceeds along a flow of step S420→step S422→step S424→step S427→step S428→step S429→step S430 in the flowchart of FIG. 4. At step S430, as shown in FIG. 13(*d*), a paired turn round point of turn round point 4 (x4, y4) is set to turn round point 3 (x3, y3). The hysteresis correction amount of the minor loop is calculated based on the current progression degree and the reduction map which is obtained by reducing the reference map of the full loop to return from turn round point 4 (x4, y4) to turn round point 3 (x3, y3). Then, the process repeats a flow of step S406-1→step S406-2→step S406-3→step S406-4→step S407→step S408→step S409→step S411→step S412→step S413→step S415→step S416 in the flowchart of FIG. 3.

In this region from turn round point 4 (x4, y4)→turn round point 3 (x3, y3), the hysteresis hydraulic pressure correction amount becomes the hysteresis correction amount of the first minor loop (the minus direction), the hysteresis correction amount of the second minor loop (the plus direction), the hysteresis correction amount of the third minor loop (the minus direction), and the hysteresis correction amount of the fourth minor loop (the plus direction).

Accordingly, at step S416, the final hysteresis hydraulic pressure correction amount of solenoid pressure $P_{SOL}$ is calculated by summation of the neutral hysteresis correction amount of the full loop, the hysteresis correction amount of the first minor loop, the hysteresis correction amount of the second minor loop, the hysteresis correction amount of the third minor loop, and the hysteresis correction amount of the fourth minor loop in the position of the same current progression degree.

In this case, when it returns to turn round point 3 (x3, y3), and moves in the full loop direction (moves out of the minor loop), the memories of turn round point 3 (x3, y3) and turn round point 4 (x4, y4) are deleted. As shown in FIG. 13(e), the reduction map using these turn round points 3 and 4 are deleted by the deletion of the turn round points 3 and 4.

(6) turn round point 3 (x3, y3)→turn round point 1 (x1, y1)

First, the process proceeds along a flow of step S400→step S401→step S402→step S403→step S405 in the flowchart of FIG. 3. The neutral hysteresis correction amount of the full loop is calculated.

The memory of the turn round points is only turn round points 1 and 2 by the deletion of turn round points 3 and 4. It becomes the same state as the above-described (3). Accordingly, subsequently to step S405, the process proceeds to step S406-1 to perform correction amount calculation No. 1 of the minor loop, and step S406-2 to perform the correction amount calculation No. 2 of the minor loop. At step S406-2, the process proceeds along a flow of step S420→step S422→step S424→step S427→step S428→step S429→step S430 in the flowchart of FIG. 4. At step S430, a paired turn round point of turn round point 2 (x2, y2) is set to turn round point 1 (x1, y1), as shown in FIG. 13(e). The hysteresis correction amount of the minor loop is calculated based on the current progression degree and the reduction map which is obtained by reducing the reference map of the full loop to return from turn round point (x2, y2) to turn round point (x1, y1).

Then, the process repeats a flow of step S406-1→step S406-2→step S407→step S408→step S409→step S411→step S412→step S413→step S415→step S416 in the flowchart of FIG. 3.

In this region of turn round point 3 (x3, y3)→turn round point 1 (x1, y1), the hysteresis hydraulic pressure correction amount becomes the hysteresis correction amount of the first minor loop (the minus direction), and the hysteresis correction amount of the second minor loop (the plus direction).

Accordingly, at step S416, the final hysteresis hydraulic pressure correction amount of solenoid pressure $P_{SOL}$ is calculated by summation of the neutral hysteresis correction amount of the full loop, the hysteresis correction amount of the first minor loop, and the hysteresis correction amount of the second minor loop in the position of the same current progression degree.

In this case, when it goes through turn round point 1, the memories of turn round point 1 (x1, y1) and turn round point 2 (x2, y2) are deleted. All of the reduction maps using turn round points 1, 2, 3, and 4 are deleted by the deletion of turn round points 1 and 2.

(7) turn round point 1 (x1, y1) point E (xe, ye)

In this case, the process repeats a flow of step S400→step S401→step S402→step S403→step S405→step S416 in the flowchart of FIG. 3.

This region of turn round point 1 (x1, y1)→point E (xe, ye) has the same characteristic as the pressure increasing characteristic of the full hysteresis characteristic, like the above-described (1). Accordingly, the hysteresis hydraulic pressure correction amount of the minor loop is zero.

Accordingly, at step S416, the final hysteresis hydraulic pressure correction amount of solenoid pressure $P_{SOL}$ is calculated by the neutral hysteresis correction amount of the full loop.

When the minor loop is further formed in the way of the reduction of the driving current in the pressure decreasing direction from point E (xe, ye), the final hysteresis hydraulic pressure correction amount of solenoid pressure $P_{SOL}$ is calculated in the same manner described above.

As mentioned above, in the first embodiment, when the minor loop continues, the plurality of the reduction maps which are obtained by reducing the reference map in accordance with the turn round point are formed. The final hysteresis hydraulic pressure correction amount is calculated by the summation of the hysteresis hydraulic pressure correction amounts obtained from the plurality of the reduction maps in the position of the same command current position.

That is, in the minor loop, the hysteresis hydraulic pressure correction amount is obtained by the reduction map which is obtained by reducing in accordance with the turn round point. Accordingly, the hysteresis hydraulic pressure correction amount corresponds to the hysteresis characteristic that the hysteresis amounts are different by the turn round positions (the used hydraulic pressure region) of the command current to linear solenoid valve 2, so that the hysteresis error is dissolved. When the minor loop continues, the final hysteresis hydraulic pressure correction amount is obtained by the summation of the hysteresis hydraulic pressure correction amounts obtained by the plurality of the reduction maps in the same command current position. Therefore, when the minor loop continues, the deviation amounts of the hysteresis hydraulic pressure correction amounts are not accumulated in accordance with the increase of the frequency of the turn round. The high calculation accuracy of the hysteresis hydraulic pressure correction amount is ensured.

The control apparatus according to the first embodiment has, as the reference map, the full hysteresis characteristic indicative of the hysteresis with respect to the hydraulic pressure variation characteristic including the pressure increasing characteristic when the command current varies from the minimum value to the maximum value, and the pressure decreasing characteristic when the command current varies from the maximum value to the minimum value (FIG. 5). In the minor loop, the turn round command current width from the present turn round point to the next turn round point is determined, the reference map is reduced in accordance with the current ratio which is the ratio of the turn round command current width to the maximum current width so that the reduction map is formed (FIG. 9).

That is, the reduction map of the minor loop is formed with the high accuracy in accordance with the principle of the generation of the hysteresis hydraulic pressure that the hysteresis characteristic of the minor loop becomes the similar figure which is obtained by reducing the hysteresis characteristic of the full loop by the current ratio.

Accordingly, it is possible to obtain the hysteresis hydraulic pressure correction amount of the minor loop with the high accuracy while the memory load is suppressed to the lower value, only by memorizing the reference map.

In the first embodiment, the central characteristic between the hydraulic pressure increasing side characteristic and the hydraulic pressure decreasing side characteristic of the reference map by the full hysteresis characteristic is set to the target characteristic. The hysteresis hydraulic pressure correction amount is calculated with respect to this target characteristic.

That is, both of the hysteresis hydraulic pressure correction amount in which the command current increases by the pressure increasing characteristic, and the hysteresis hydraulic pressure correction amount in which the command current decreases by the pressure decreasing characteristic becomes the one-sided hysteresis amount.

Accordingly, even when the minor loop is started from the pressure increasing characteristic or the pressure decreasing characteristic, the hysteresis hydraulic pressure correction amount of the minor loop can be obtained only by varying the sign of plus/minus. Accordingly, it is possible to simplify the calculation of the hysteresis hydraulic pressure correction amount with respect to the target characteristic.

[Turn Round Point Memory Control Operation] In the first embodiment, the following three methods are employed so as to suppress the increase of the turn round point memory, and to address a case in which the minor loop continues, by a small number of the memory. First, when it is further turned back near the turn round point memory which is already memorized so as to further form the loop within the minor loop, this is not memorized (memory prohibition). Second, based on the principle 1 of the generation, when it moves out of the minor loop, the upper and lower memories are deleted (the reset of the own memory and the paired memory) since the turn round point memory of the minor loop is no needed. Third, based on the principle 2 of the generation, when it moves outside the hysteresis correction current region along the full loop after it returns to the turn round point of the full loop, all of the turn round point memories are deleted (all memory reset). Hereinafter, the memory operation of the turn round point, the reset operation of the own memory+the paired memory, the all memory reset operation, and the memory prohibition operation are illustrated.

In the illustration of the turn round point memory control operation, as shown in the upper portions of FIGS. 12 and 13, the command current is moved from point S (xs, ys) along the pressure increasing characteristic, and enters from turn round point 1 (x1, y1) into the minor loop. Then, in the minor loop, it moves along a flow of turn round point 1 (x1, y1)→turn round point 2 (x2, y2)→turn round point 3 (x3, y3)→turn round point 4 (x4, y4) to draw the loop. Then, it moves through turn round point 4 (x4, y4) and turn round point 3 (x3, y3), and returns to turn round point 1 (x1, y1) on the full loop. Then, it moves to point E (xe, ye) of the upper limit value along the full loop. This example is illustrated below.

(1) Memory Operation of Turn Round Point

When it (the command current) is moved from point S(xs, ys) along the pressure increasing characteristic, and enters from turn round point 1 (x1, y1) into the minor loop, the process proceeds along a flow of step S440→step S441→step S442→step S445→step S446→step S447 in the flowchart of FIG. 6. At step S447, the information of the current value and the turn round direction of turn round point 1 (x1, y1) are memorized. The flow of step S445→step S446→step S447→step S448 is repeated.

Then, when it is moved from turn round point 1 (x1, y1) to turn round point 2 (x2, y2), the process proceeds along a flow of step S440→step S441→step S443→step S444→step S445→step S446→step S447 in the flowchart of FIG. 6. At step S447, the information of the current value and the turn round direction of turn round point 2 (x2, y2) is memorized. A flow of step S445→step S446→step S447→step S448 is repeated.

Then, when it is moved from turn round point 2 (x2, y2) to the turn round point (x3, y3), the process proceeds along a flow of step S440→step S441→step S442→step S445→step S446→step S447 in the flowchart of FIG. 6. At step S447, the information of the current value and the turn round direction of turn round point 3 (x3, y3) is memorized, and the flow of step S445→step S446→step S447→step S448 is repeated.

Then, when it is moved from turn round point 3 (x3, y3) to turn round point 4(x4, y4), the process proceeds along a flow of step S440→step S441→step S443→step S444→step S445→step S446→step S447 in the flowchart of FIG. 6. At step S447, the information of the current value and the turn round direction of the turn round point 4 (x4, y4) is memorized, a flow of step S445→step S446→step S447→step S448 is repeated.

That is, when the current value at the turn round judgment is outside the additional memory prohibition current region, like turn round point 1 (x1, y1), turn round point 2 (x2, y2), turn round point 3 (x3, y3), and turn round point 4 (x4, y4), the information of the current values and the turn round directions of the turn round points 1, 2, 3, and 4 are memorized. When this turn round point information is memorized, at step S448, the additional memory prohibition current region is determined in accordance with the flowchart of FIG. 7. This additional memory prohibition current region is calculated by the residual current width and the residual memory number. In a case in which the memory number is, for example, 20, when turn round point 2 (x2, y2) is memorized in the memory, the residual current width is set to the current width between turn round point 1 and turn round point 2. The residual memory number is 18 (two turn round point information of turn round point 1 and turn round point 2 are already memorized in the two memories).

(2) Reset Operation of Own Memory+Paired Memory

When it is returned from turn round point 4 (x4, y4) to turn round point 3 (x3, y3), and moved out of the minor loop, the process proceeds along a flow of step S440→step S441→step S443→step S452→step S454→step S455→step S456→step S458→step S447 in the flowchart of FIG. 6. At step S447, the information of the current values and the turn round directions of the turn round point 3 (x3, y3) and turn round point 4 (x4, y4) which are already memorized are deleted.

That is, it is separated from the minor loop by the turn round points 3 and 4 formed within the minor loop by the turn round points 1 and 2 based on the principle 1 of the generation of the hysteresis hydraulic pressure, by returning from the turn round point 4 to the turn round point 3, and moving out of the minor loop. The minor loop is not further formed within turn round points 3 and 4. That is, the memories of turn round points 3 and 4 are deleted since the turn round information of turn round points 3 and 4 are not used due to the separation from the minor loop.

(3) All Memory Reset Operation

When it is returned from the turn round point 3 (x3, y3) to the turn round point 1 (x1, y1), and moved on the full loop toward the point E (xe, ye), and the present current value is outside the hysteresis correction current region, the process proceeds along a flow of step S440→step S441→step S443→step S452→step S453→step S447 in the flowchart of FIG. 6. At step S447, the memories of the information of the current values and the turn round directions of the turn round points are deleted.

That is, when it is returned from the turn round point 3 to the turn round point 1 on the full loop, the hydraulic pressure is varied in accordance with the static characteristic (the pressure increasing characteristic) in accordance with the principle 2 of the generation of the hysteresis hydraulic pressure. Then, when it goes through the turn round point 1, and moves out of the hysteresis correction current region, the stored turn round points are deleted. This is because the past turn round point (for example, the turn round point 1) and the paired turn round point (for example, the turn round point 2) are deleted by passing through the past turn round point (for example, turn round point 1). For example, when the command current is decreased from point E, and returned to point E by turning back at turn round point 5 (the command current larger than point S), the command current does not become greater than the current value corresponding to the point E, and the point E and the turn round point 5 are not deleted. For preventing the increase of the consumption of the memory by this, when the command current becomes outside the hysteresis correction current region (for example, 5 mA>the command current, 795 mA<the command current), the memorized turn round points are deleted. Moreover, when the command current is increased from point S, turned back at the turn round point 5, and returned to the point S, the stored turn round points are also deleted. Accordingly, the hysteresis correction current region is set to have a predetermined current width from the point S and the point E.

(4) Memory Prohibition Operation

Figure 14:
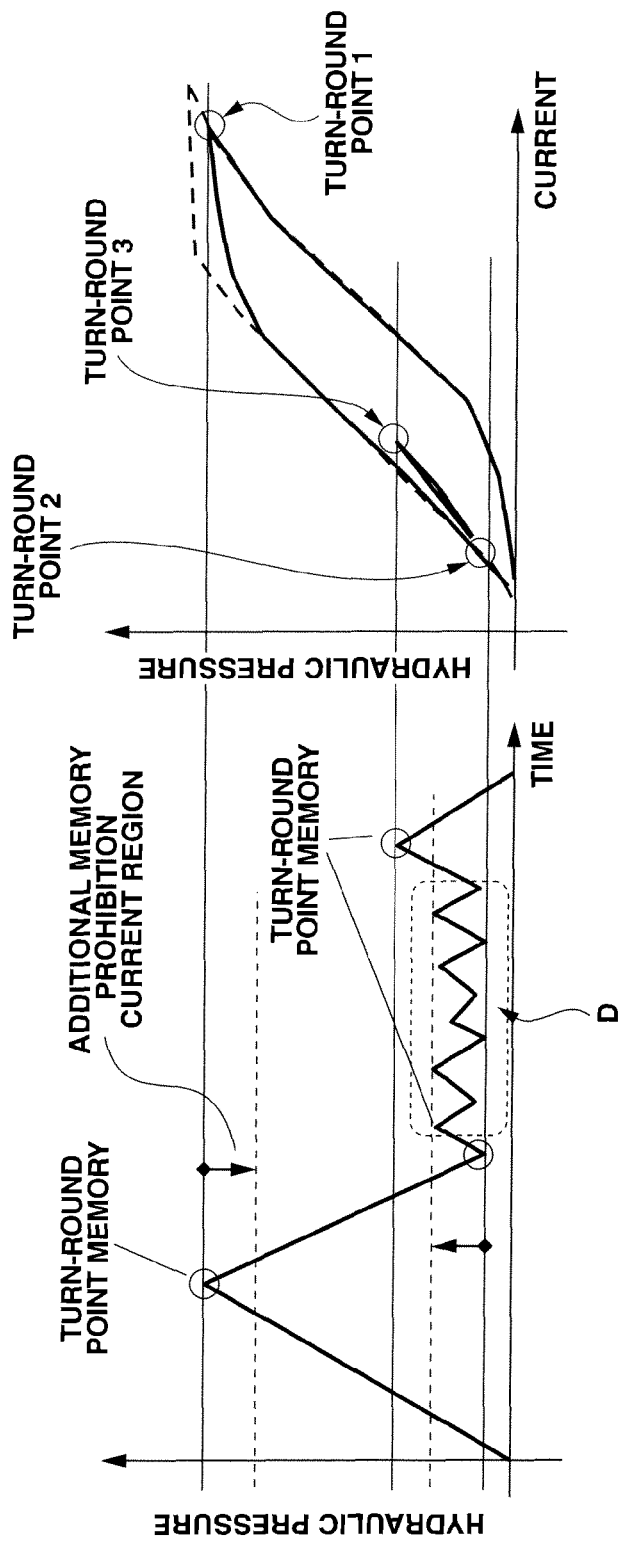
FIG. 14 is an illustrative view showing a memory prohibition operation when minute current turn-rounds are continued in the minor loop in a Rise prohibition current region.

When it enters from the turn round point 1 into the minor loop, and moved to the turn round point 2, and then the minute current turn round is performed in the additional memory prohibition region as shown in D of FIG. 14, the process proceeds along a flow of step S440→step S441→step S442→step S445→step S449→step S450→step S451→step S447 in the flowchart of FIG. 6, or along a flow of step S440→step S441→step S443→step S444→step S445→step S449→step S450→step S451→step S447. At step S447, the memory of the information of the current value of the minute current turn round point and the turn round direction are prohibited.

Figure 15:
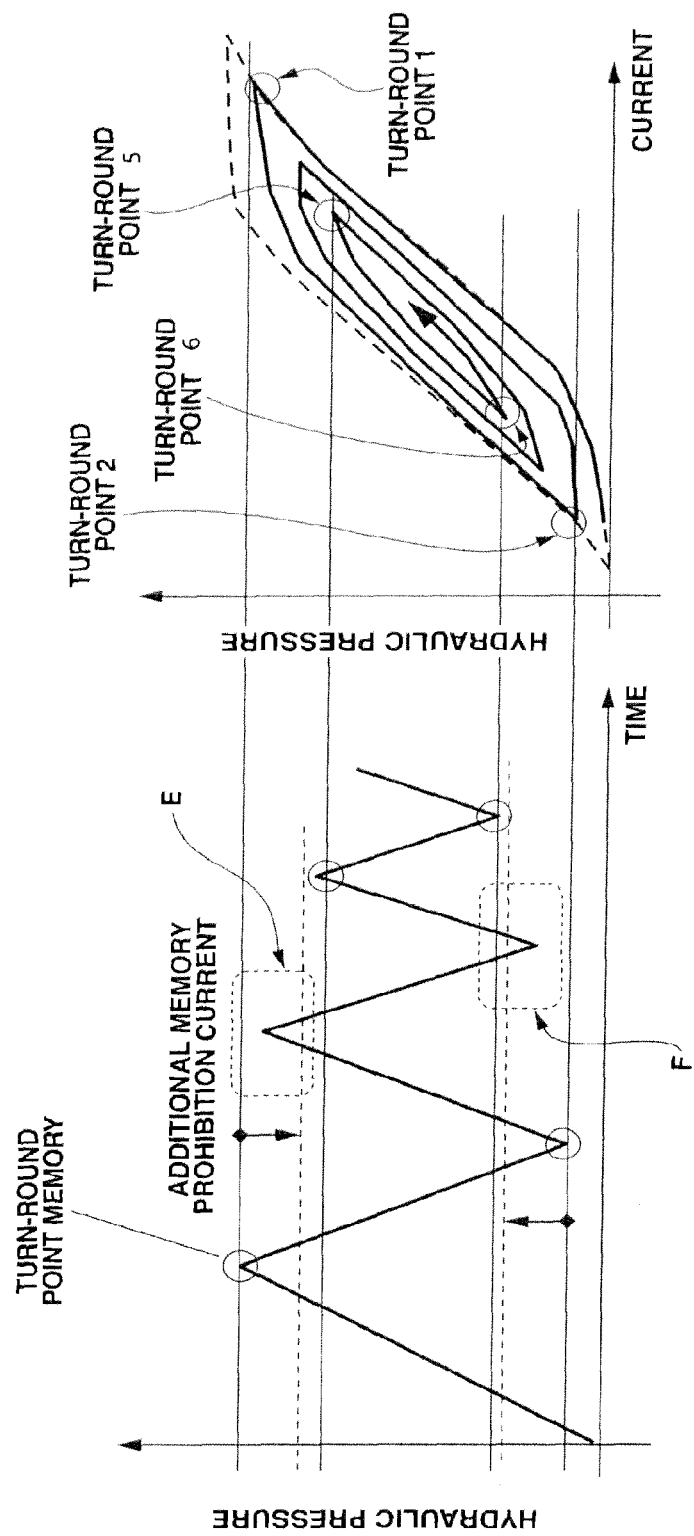
FIG. 15 is an illustrative view showing a memory prohibition operation when the turn-round is performed in the minor loop in a Fall prohibition current region and the turn-round is performed in the minor loop in the Rise prohibition current region.

When it enters from turn round point 1 into the minor loop, and moved to the turn round point 2, and the Fall turn round is performed in the additional memory prohibition region as shown in E of FIG. 15, the process proceeds along a flow of step S440→step S441→step S442→step S445→step S449→step S451→step S447 in the flowchart of FIG. 6. At step S447, the memory of the information of the current value and the turn round direction of the Fall turn round point within the additional memory prohibition current region is prohibited. Moreover, when the Rise turn round is performed within the additional memory prohibition current region as shown in F of FIG. 15, the process proceeds along a flow of step S440→step S441→step S443→step S444→step S445→step S449→step S450→step S451→step S447 in the flowchart of FIG. 6. At step S447, the memory of the information of the current value and the turn round direction of the Rise turn round point in the additional memory prohibition current region is prohibited.

That is, when the minute current turn round continues, and it is turned back near the turn round point memory which is memorized already, the additional memorization of the turn round point memory is prohibited.

As illustrated above, in the first embodiment, when the minor loop continues, when the difference between the previous turn round point current value and the turn round point current value at this time is smaller than a predetermined value, the additional memory of the information of the turn round point at this time is prohibited (steps S449-S451 of FIG. 6).

That is, in a case in which the minute current turn round continues and the turn-round is preformed near the turn round point memory which is memorized already, when the all of the turn round points are memorized, the number of the memory which is previously prepared is enormous.

In this case, for prohibiting the additional memory of the turn round point memory, it is possible to decrease the number of the memory prepared.

In the control apparatus according to the first embodiment, the predetermined value is set to the additional memory prohibition current region (step S448 of FIG. 6, and FIG. 7) which is obtained by calculating the residual current width from the current memory value of the newest turn round point stored at each turn round direction, and dividing the residual current width by the sum of the residual memory number and 1.

That is, in a case in which the predetermined value which is the additional memory prohibition current region is constant value, the number of the memory prepared for the turn round point memory may be deficient or excess.

On the other hand, the predetermined value which is the additional memory prohibition current region is determined by the residual current width and the number of the residual memory. Accordingly, the number of the memory prepared for the turn round point memory is not deficient or excess. Even when the plural number of the minor loops are formed, it is possible to calculate the hysteresis hydraulic pressure correction amount.

In this example, when the minor loop continues, in a case in which it returns to the past turn round point with the memory information, and then it is moved out of the minor loop, the memory information of the past turn round point and the paired turn round point are deleted (steps S454-steps S458 of FIG. 6).

Accordingly, it is possible to prevent from interfering with the calculation of the hysteresis hydraulic pressure correction amount of the minor loop, and to suppress the increase of the number of the memory prepared for the turn round point memory.

In the first embodiment, when the minor loop continues, it returns to the initial turn round point on the loop by the full hysteresis characteristic, and then the present current value becomes outside the hysteresis correction current region, all of the memory information of the turn round points of the minor loop are deleted (steps S452-S453 of FIG. 6).

Accordingly, all of the number of the memory are waited for the turn round point memory for the calculation of the hysteresis hydraulic pressure correction amount when it (the instruction current) enters at the next time.

Next, effects are illustrated. The hydraulic pressure control apparatus according to the first embodiment of the present invention attains the following effects.

(1) A hydraulic pressure control apparatus includes: a solenoid valve (linear solenoid valve 2) configured to regulate an opening degree in accordance with a command current (solenoid current $I_{SOL}$), and to control to increase or decrease a hydraulic pressure; a hysteresis hydraulic pressure correction amount calculation section (FIGS. 3 and 4) configured to calculate a hysteresis hydraulic pressure correction amount which is determined by a hysteresis characteristic of an output hydraulic pressure (solenoid pressure $P_{SOL}$) with respect to the command current in an increasing direction and in a decreasing direction of the command current; and a command current control section (clutch pressure correction control section 40) configured to control the command current in accordance with the hysteresis hydraulic pressure correction amount so that the output hydraulic pressure becomes a target output hydraulic pressure, the hysteresis hydraulic pressure correction amount calculation section (FIGS. 3 and 4) having, as a reference map, a full hysteresis characteristic representing a hysteresis with respect to a hydraulic pressure variation characteristic having a pressure increasing characteristic when the command current is varied from a minimum value to a maximum value, and a pressure decreasing characteristic when the command current is varied from the maximum value to the minimum value, the hysteresis hydraulic pressure correction amount calculation section being configured to make a plurality of reduction maps each of which is obtained by reducing the reference map in accordance with a turn-round position at one of minor loops from a past to a present time when the minor loop in which the command current is turned back in a middle within the hydraulic pressure variation characteristic region continues, and to calculate the hysteresis hydraulic pressure correction amount by summation of the hysteresis hydraulic pressure correction amounts obtained by the plurality of the reduction maps in the same command current position.

In this way, the hysteresis error correction according to the turn-round position and the turn round frequency of the command current to the electromagnetic valve (linear solenoid valve 2) is performed. Accordingly, it is possible to improve the accuracy of the hydraulic pressure control. In particular, this is effective to the hydraulic pressure control of the electromagnetic valve configured to perform the slip engagement control of the frictional element in which the minor loop is continued.

(2) The hysteresis hydraulic pressure correction amount calculation section (FIGS. 3 and 4) is configured to determine a turn-round command current width from the turn-round point at this time to the turn-round point at a next time in the minor loop in which the command current is turned back in the middle of the hydraulic pressure variation characteristic region, and to make the reduction map by reducing the reference map in accordance with a current ratio which is a ratio of the turn-round command current width to the current width of the hydraulic pressure variation characteristic (FIG. 9).

Accordingly, it is possible to suppress the memory load merely by memorizing and setting the one reference map, and to obtain the hysteresis hydraulic pressure correction amount in the minor loop at the high accuracy.

(3) The hysteresis hydraulic pressure correction amount calculation section (FIGS. 3 and 4) is configured to set, to a target characteristic, a central characteristic between a pressure increasing side characteristic and a pressure decreasing side characteristic in the reference map of the full hysteresis characteristic, and to calculate the hysteresis hydraulic pressure correction amount with respect to the target characteristic (FIG. 10).

Accordingly, it is possible to obtain a hysteresis hydraulic pressure correction amount of the minor loop merely by varying signs of plus/minus even when the minor loop is started from the pressure increasing characteristic or the pressure decreasing characteristic, and to simplify the calculation of the hysteresis hydraulic pressure correction amount with respect to the target characteristic.

(4) The hysteresis hydraulic pressure correction amount calculation section (FIGS. 3 and 4) includes a turn-round point memory control section (FIGS. 6 and 7) configured to prohibit an additional memorization of a turn-round information at this time in a case in which a difference between the turn-round point current value at a previous time and the turn-round point current value at this time is smaller than a predetermined value when the minor loop in which the command current is turned back in the middle of the hydraulic pressure variation characteristic region continues (step S449-step S451 of FIG. 6).

With this, when the turn-rounds of the minute current are performed near the turn-round point memory memorized already and the turn-round is performed near the turn-round point memory memorized already, the additional memorization of the turn-round point memory is prohibited. Accordingly, it is possible to decrease the number of the memory prepared.

(5) The turn-round point memory control section (FIGS. 6 and 7) is configured to calculate a residual current width from newest turn-round point current memory values each memorized at each turn-round direction, and to set, to an additional memory prohibition current region which is the predetermined value, a value obtained by dividing the residual current width by a summation of the residual memory number and 1 (step S448 in FIG. 6, and FIG. 7).

Accordingly, the number of the memory prepared for the turn-round position memory is not deficient or excess. Therefore, it is possible to calculate the hysteresis hydraulic pressure correction amount even when the plurality of the minor loops are formed.

(6) The turn-round point memory control section (FIGS. 6 and 7) is configured to delete the memory information of the past turn-round point and a paired turn-round point in a case in which it returns to a past turn-round point having the memory information and then it is moved outside the minor loop when the minor loop in which the command current is turned back in the middle of the hydraulic pressure variation characteristic region continues (step S454-step S458 of FIG. 6).

Accordingly, it is possible to suppress the increase of the number of the memory prepared for the turn-round point memory, without interfering with the calculation of the hysteresis hydraulic pressure correction amount of the minor loop.

The turn-round point memory control section (FIGS. 6 and 7) is configured to all of the turn-round point memory information of the minor loop when the command current becomes outside a hysteresis correction current region (step S452-step S453 of FIG. 6).

Accordingly, it is possible to ready all of the number of the memory for the turn-round point memory for the calculation of the hysteresis hydraulic pressure correction amount when it enters the minor loop at the next time.

In the hydraulic pressure control apparatus according to the first embodiment, the central characteristic of the reference map by the full hysteresis characteristic is the target characteristic. However, a characteristic connecting point S and point E by straight line may be set to the target characteristic. The pressure increasing characteristic of the reference map by the full hysteresis characteristic may be set to the target characteristic. The pressure decreasing characteristic of the reference map by the full hysteresis characteristic may be set to the target characteristic.

In the first embodiment, the present invention is applied to the hydraulic pressure control apparatus using the linear solenoid valve of a normal low type that the hydraulic pressure is proportionally increased as the command current becomes larger. Moreover, the present invention is applicable to a hydraulic pressure control apparatus using a linear solenoid valve of a normal high type that the hydraulic pressure is proportionally decreased as the command current becomes larger. Furthermore, in the first embodiment, the present invention is applied to the hydraulic pressure control apparatus to control the frictional engagement element pressure of the automatic transmission for the vehicle. Moreover, the present invention is applicable to various objects that the high accurate hydraulic pressure control is required.

The entire contents of Japanese Patent Application No. 2010-242142 filed Oct. 28, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:
1. A hydraulic pressure control apparatus comprising:
a solenoid valve configured to regulate an opening degree in accordance with a command current, and to control the opening degree to increase or decrease a hydraulic pressure;

a hysteresis hydraulic pressure correction amount calculation section configured to calculate a hysteresis hydraulic pressure correction amount which is determined by a hysteresis characteristic of an output hydraulic pressure with respect to the command current in an increasing direction of the command current and in a decreasing direction of the command current; and a command current control section configured to control the command current in accordance with the hysteresis hydraulic pressure correction amount so that the output hydraulic pressure becomes a target output hydraulic pressure, wherein the hysteresis hydraulic pressure correction amount calculation section is configured to:

refer to a reference map for a full hysteresis characteristic, the full hysteresis characteristic corresponding to a hysteresis with respect to a hydraulic pressure variation characteristic having a pressure increasing characteristic when the command current is varied from a minimum value to a maximum value, and a pressure decreasing characteristic when the command current is varied from the maximum value to the minimum value, generate each of a plurality of reduction maps by reducing the reference map in accordance with a ratio determined based on a turn-round position of a minor loop for a time period during which the command current is turned back within a hydraulic pressure variation characteristic region, determine, for each of the plurality of reduction maps, a correction amount for a same current progression degree, and calculate the hysteresis hydraulic pressure correction amount by summation of each correction amount.

2. The hydraulic pressure control apparatus as claimed in claim 1, wherein the hysteresis hydraulic pressure correction amount calculation section is configured to determine a turn-round command current width from the turn-round point at the present time to the turn-round point at a next time in the minor loop in which the command current is turned back in the middle of the hydraulic pressure variation characteristic region, and to make the reduction map by reducing the reference map in accordance with a current ratio which is a ratio of the turn-round command current width to the current width of the hydraulic pressure variation characteristic.

3. The hydraulic pressure control apparatus as claimed in claim 1, wherein the hysteresis hydraulic pressure correction amount calculation section is configured to set, to a target characteristic, a central characteristic between a pressure increasing side characteristic and a pressure decreasing side characteristic in the reference map of the full hysteresis characteristic, and to calculate the hysteresis hydraulic pressure correction amount with respect to the target characteristic.

4. The hydraulic pressure control apparatus as claimed in claim 1, wherein the hysteresis hydraulic pressure correction amount calculation section includes a turn-round point memory control section configured to prohibit an additional memorization of a turn-round information at the present time in a case in which a difference between the turn-round point current value at a previous time and the turn-round point current value at the present time is smaller than a predetermined value when the minor loop in which the command current is turned back in the middle of the hydraulic pressure variation characteristic region continues.

5. The hydraulic pressure control apparatus as claimed in claim 4, wherein the turn-round point memory control section is configured to calculate a residual current width from newest turn-round point current memory values each memorized at each turn-round direction, and to set, to an additional memory prohibition current region which is the predetermined value, a value obtained by dividing the residual current width by a summation of the residual memory number and 1.

6. The hydraulic pressure control apparatus as claimed in claim 4, wherein the turn-round point memory control section is configured to delete the memory information of the past turn-round point and a paired turn-round point in a case in which it returns to a past turn-round point having the memory information and then it is moved outside the minor loop when the minor loop in which the command current is turned back in the middle of the hydraulic pressure variation characteristic region continues.

7. The hydraulic pressure control apparatus as claimed in claim 4, wherein the turn-round point memory control section is configured to delete all of the turn-round point memory information of the minor loop when the command current becomes outside of a hysteresis correction current region.

* * * * *